(12) United States Patent
Himoto et al.

(10) Patent No.: US 7,473,180 B2
(45) Date of Patent: *Jan. 6, 2009

(54) CONTROLLER AND EXPANSION UNIT FOR CONTROLLER

(75) Inventors: Atsunori Himoto, Tokyo (JP); Kenji Tosaki, Tokyo (JP)

(73) Assignee: Sega Enterprises, Ltd., Tokyo (JP)

( * ) Notice: Subject to any disclaimer, the term of this patent is extended or adjusted under 35 U.S.C. 154(b) by 604 days.

This patent is subject to a terminal disclaimer.

(21) Appl. No.: 11/107,818

(22) Filed: Apr. 18, 2005

(65) Prior Publication Data

US 2005/0215322 A1 Sep. 29, 2005

Related U.S. Application Data

(60) Continuation of application No. 10/106,022, filed on Mar. 27, 2002, now Pat. No. 7,081,051, which is a division of application No. 08/952,312, filed on Feb. 27, 1998, now abandoned.

(51) Int. Cl.
  *A63F 9/24* (2006.01)
  *A63F 13/00* (2006.01)
  *G06F 17/00* (2006.01)
  *G06F 19/00* (2006.01)

(52) U.S. Cl. ............... 463/37; 200/5; 200/6; 345/156; 345/168; 345/169; 273/148 R

(58) Field of Classification Search ............... 463/37
See application file for complete search history.

(56) References Cited

U.S. PATENT DOCUMENTS

| | | | |
|---|---|---|---|
| 4,469,330 A | 9/1984 | Asher | |
| 4,552,360 A | 11/1985 | Bromley et al. | |
| 5,207,426 A | 5/1993 | Inoue et al. | |
| 5,232,223 A | 8/1993 | Dornbusch | |
| 5,296,871 A | 3/1994 | Paley | |
| 5,451,053 A | 9/1995 | Garrido | |
| 5,551,693 A | 9/1996 | Goto et al. | |
| 5,644,113 A | 7/1997 | Date et al. | |
| 5,684,722 A | 11/1997 | Thorner et al. | |
| 5,820,462 A | 10/1998 | Yokoi et al. | |
| 5,897,437 A | 4/1999 | Nishiumi et al. | |
| 6,022,274 A | 2/2000 | Takeda et al. | |
| 6,186,896 B1 * | 2/2001 | Takeda et al. | 463/38 |
| 6,231,444 B1 * | 5/2001 | Goto et al. | 463/37 |

FOREIGN PATENT DOCUMENTS

JP  07-200162  8/1995

\* cited by examiner

*Primary Examiner*—Robert E Pezzuto
*Assistant Examiner*—Paul Anthony D'Agostino
(74) *Attorney, Agent, or Firm*—Dickstein Shapiro LLP

(57) ABSTRACT

An expansion unit 50, 60 or 70 is connected to a controller body 10 including an analog direction key 12, a digital direction key 14, command buttons 20a-20z, command levers 22l, 22r, etc. An expansion unit 50 including a photo emitting unit 52 is connected to thereby make the controller cordless. An expansion unit 60 including a photo detecting unit 65, whereby shooting games in which an enemy on a monitor screen can be shot can be played. An expansion unit 70 including a vibration unit 75 is connected, whereby a vibration is given to the controller body 10 to make a shooting game more realistic. New functions can be added to the conventional controller, and the new functions can be added freely without making no change to the controller body.

1 Claim, 36 Drawing Sheets

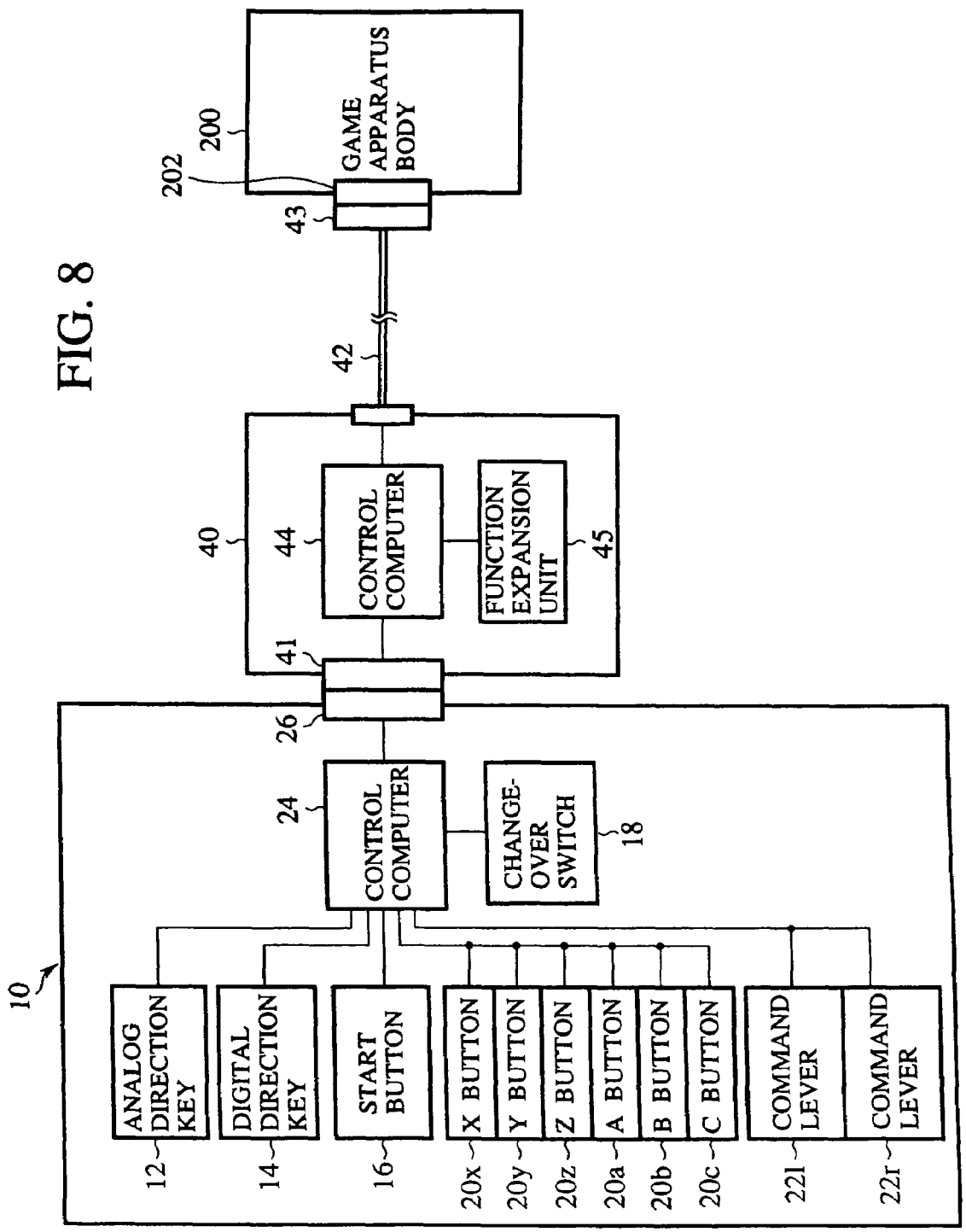

FIG. 9A

PIN ARRANGEMENT OF EXPANSION UNIT 26
FOR CONTROLLER BODY 10

| SIGNAL NAME | PIN NO. | CONTENTS |
|---|---|---|
| TH | P4 | MAINLY CONTROL LINE (SELECT) FROM EXPANSION UNIT |
| TR | P5 | MAINLY CONTROL LINE (REQUEST) FROM EXPANSION UNIT |
| TL | P6 | MAINLY CONTROL LINE (RESPONSE) TO EXPANSION UNIT |
| R | P7 | MAINLY DATA LINE (3 BITS) |
| L | P8 | MAINLY DATA LINE (2 BITS) |
| D | P2 | MAINLY DATA LINE (1 BIT) |
| U | P3 | MAINLY DATA LINE (0 BIT) |
| VCC | P1 | ELECTRIC POWER SOURCE (+5V) |
| GND | P9 | GND |

FIG. 9B

PIN ARRANGEMENT OF CONNECTOR 41
FOR EXPANSION UNIT 40

| SIGNAL NAME | PIN NO. | CONTENTS |
|---|---|---|
| TH | P4 | MAINLY CONTROL LINE (SELECT) TO CONTROLLER |
| TR | P5 | MAINLY CONTROL LINE (REQUEST) TO CONTROLLER |
| TL | P6 | MAINLY CONTROL LINE (RESPONSE) FROM CONTROLLER |
| R | P7 | MAINLY DATA LINE (3 BITS) |
| L | P8 | MAINLY DATA LINE (2 BITS) |
| D | P2 | MAINLY DATA LINE (1 BIT) |
| U | P3 | MAINLY DATA LINE (0 BIT) |
| VCC | P1 | ELECTRIC POWER SOURCE (+5V) |
| GND | P9 | GND |

<AS VIEWED FROM BACK>

<AS VIEWED FROM SIDE>

CONTROLLER AND EXPANSION UNIT FOR CONTROLLER

This application is a continuation of U.S. patent application Ser. No. 10/106,022, filed Mar. 27, 2002, now U.S. Pat. No. 7,081,051 which is a divisional of application of Ser. No. 08/952,312, filed Feb. 27, 1998, now abandoned the entire disclosures of which are incorporated herein by reference.

TECHNICAL FIELD

The present invention relates to a controller which outputs various instructions to an electronic device, such as a game device, by operation of an operator.

BACKGROUND ART

More than several years have passed since video game devices for domestic use first appeared, and recently a large variety of entertaining games have been developed. Video games for the domestic use are very popular as an entertainment. Domestic game devices are connected to input means called controllers. Players operate the controllers to output various instructions to the game devices.

Thus the controllers intervene between the players and the game devices, and act as a man-machine interface, and thus are very important to the game devices. The ease of operation as well as the functional ability of the controllers are closely related to the feasibility and entertainment value of games.

Various types of controllers for the domestic game devices have been proposed, but in general most controllers for the domestic video game devices include direction keys which command directions as well as a plurality of command buttons.

However, the command buttons of the conventional controller can make only one command by one operation thereof, and is unsuitable to continuously make commands. It is very difficult especially to make command which are continuously changed. When continuously changed commands must be made, nothing other than unnatural operations of pushing the command buttons for various periods of time or pushing the command buttons repeatedly a number of times.

The direction buttons of the conventional controller can command only four or eight directions, and cannot command directions between these directions, and continuous direction changes.

The conventional controller originally had only the direction keys and two command buttons, but as games have become complicated, two command buttons have been increased to three, and recently six command buttons have become common. Six buttons are a limit to be easily operated by one player, which has made it difficult to meet new games which require more command buttons.

Recently the method for operating the controller has become increasingly complicated, which makes it difficult for players to stably operate the controller. A controller which can be stably operated is required.

When a game producer thinks up contents of a game, it is necessary for him to keep in mind, the ease of operational of the controller. Also, the functional ability of a controller and game contents are closely related. Usually common controllers are used when games are designed. Thus, their functional ability and ease of operation of the controller limit the contents of a game.

Conversely, in order to give priority to the game's contents, new controllers that are more suitable for the game contents are provided in some cases. Unfortunately, a large burden is places on the users.

To add controller functions to suit the contents of a particular game, expansion units can be connected to a controller. In order for any expansion unit to be connected, a controller which permits any expansion unit which will appear to be connected must be designed. This method also has a limit.

Conventional controllers, on the other hand, are totally inconsiderate of a player's grip. For example, the contour of a conventional controller is merely rectangular or parallel, and sometimes a handle is merely provided on the controller.

Players may be children or adults, and may have various hand sizes and various gripping habits. Depending on the game contents, it may be better to change carrying way of the controller. The conventional controller does not meet such requirements.

An object of the present invention is to provide a controller expansion unit which can freely realize a controller having a function suitable for contents of a game.

Another object of the present invention is to provide a controller which can be gripped in various ways according to the operator's preference.

Further another object of the present invention is to provide a controller which can be gripped in ways such that operators can easily operate the controller.

Further another object of the present invention is to provide a controller which can make commands which are continuously changed.

Further another object of the present invention is to provide a controller which can command an arbitrary direction and continuously changed directions.

Further another object of the present invention is to provide a controller which can include a number of command buttons.

Further another object of the present invention is to provide a controller which can be stably operated.

DISCLOSURE OF THE INVENTION

The above-described objects are achieved by a controller expansion unit which is to be inserted between a controller body including an operation key and a game apparatus, and which supplies a command signal generated by the operation key of the controller body to the game apparatus body, whereby new functions can be added to the conventional controller, and the new functions can be added freely without making no change to the controller body.

The above-described controller expansion unit may comprise function expansion means for expanding a function of the controller body, and conversion means for converting the command signal from the controller body, based on a function expanded by the function expansion means, and supplying the converted command signal to the game apparatus body.

In the above-described controller expansion unit, the function expansion means may include photo signal outputting means for outputting the signal to the game apparatus body as a photo signal, and the photo signal outputted by the photo signal outputting means may be detected by photo signal detecting means of the game apparatus body, whereby the controller can be cordless.

In the above-described controller expansion unit, the function expansion means may include photo signal detecting means for detecting a photo signal from the outside, and the conversion means may add the photo signal from the photo signal detecting means to the command signal from the controller body, whereby gun games in which an optical signal from the video monitor is detected to shoot an enemy on a monitor screen.

In the above-described controller expansion unit, the function expansion means may include vibration means for giving a vibration to the controller body, based on the signal from the game apparatus body or the controller body, whereby in a shooting game, for example, vibrations generated upon shooting are added to thereby make the game realistic.

In the above-described controller expansion unit, the function expansion means may include an operation key for effecting a specific operation, and the conversion means may add an operation signal generated by the specific operation keys to the command signal from the controller body, whereby new operational keys can be easily added.

In the above-described controller expansion unit, the function expansion means may include memory means for storing information, and the memory means may store information supplied from the game apparatus body or the controller body, or information supplied to the game apparatus body or the controller body, whereby new memories are added to thereby reinforce functions of the game apparatus.

In the above-described controller expansion unit, the function expansion means may include display means for displaying information, and the display means may display information from the game apparatus body or the controller body, whereby new image display means is added to thereby reinforce functions of the game apparatus.

In the above-described controller expansion unit, the function expansion means may include clock means for counting time, and time display means for displaying time, and the conversion means may add time information counted by the clock means to the command signal from the controller body, whereby games making use of time information can be played.

In the above-described controller expansion unit, the function expansion means include rotation angle detecting means for detecting a rotation angle of the controller body supported thereon, and the conversion means may add rotation angle signals detected by the rotation angle detecting means to the command signal from the controller body, whereby the controller body can be operated as a handle of a car or others.

In the above-described controller expansion unit, the function expansion means may include inclination detecting means for detecting an inclination of the controller body, and the conversion means may add an inclination signal detected by the inclination detecting means to the command signal supplied from the controller body, whereby an inclination of the controller body can be an operation signal, which make games realistic.

In the above-described controller expansion unit, the conversion means supplies an inclination signal given by the inclination detecting means in place of a direction command signal from the controller body, whereby a direction command can be made by an inclination of the controller, which realizes games having new operational feelings.

The above-described objects are achieved by a controller comprising a controller body including an operation key, and the above-described controller expansion unit.

The above-described objects are achieved by a controller comprising, on an operation surface of a body of the controller, a direction key for a direction command, and a plurality of command buttons for outputting a single command, the operation surface of the controller body having a substantially circular outer edge so that an operator can grip the controller body at any positions around the outer edge of the operation surface.

In the above-described controller, a part of the outer edge of the operation surface of the controller body may be shaped in relation to a specific direction of the direction key so that, when the operator holds the operation surface with his hand, he can know the specific direction of the direction key, whereby when an operator grips the operational surface with a hand, a specific direction of the direction key can be known.

In the above-described controller, the controller body may include lugs to be held by the operator, and a part of a lug may be shaped in relation to a specific direction of the direction key so that, when the operator grips the operation surface with his hand, he can know the specific direction of the direction key, whereby an operator can know a specific direction of the direction key.

The above-described objects are achieved by a controller comprising: a controller body; a direction key disposed on a first operational surface of the controller body, and commanding a direction; a plurality of command buttons disposed on the first operational surface and outputting one command by one operation; and a command lever disposed on a second operational surface of the controller and outputting continuously changed command amounts by one operation, whereby continuously changed commands can be easily made.

In the above-described controller it is preferable that the direction key comprises: a direction key operating unit; discrete direction determining means for determining a specific direction out of a plurality of prescribed directions, based on a state of the direction key operation unit; and continuous direction determining means for determining continuous command directions, based on a state of the direction key operation unit, whereby an arbitrary direction command and continuously changed direction commands can be made.

In the above-described controller it is preferable that the direction key further including change-over means for changing over the discrete direction determining means and the continuous direction determining means to each other.

In the above-described controller it is preferable that the command lever is a command button which outputs one command by one operation.

In the above-described controller it is preferable that the direction key and the command buttons are disposed at positions which facilitate operation with the left and the right thumbs of an operator when he holds the controller with the left and the right hands, and the command lever is disposed at a position which facilitates operation with the fingers other than the thumbs, whereby a number of buttons and keys can be easily operated.

In the above-described controller it is preferable that the controller body includes two grips to be held by an operator; and the direction key and the command buttons are disposed at positions which facilitate operation with the left and the right thumbs of the operator when he holds the two grips with the left and the right hands, and the command lever is disposed at a position which facilitates operation with the fingers other than the thumbs. When the controller is operated, held with the hands, the grips are firmly held with both hands, which makes the operation stable.

In the above-described controller it is preferable that a projection is provided on the second operational surface of the controller body; the controller can be placed on a flat surface, supported by the projection and the two grips; the direction key and the command buttons are disposed at positions which facilitate operation with the left and the right thumbs of an operator when the controller is placed on a flat surface, and the command lever is disposed at a position which facilitates with the fingers other than the thumbs. When the controller is placed on a desk or the like to be operated, the controller is set on a flat surface such as a desk or the like, supported by the projection and the two grips, which makes the operation stable.

BRIEF DESCRIPTION OF THE DRAWINGS

FIG. 7 is a block diagram of the controller according to the first embodiment with an expansion unit which does not add expansion functions connected to.

FIG. 8 is a block diagram of the controller according to the first embodiment with an expansion unit which adds expansion functions connected to.

FIG. 9 is views of pin arrangements of the connectors of an expansion unit and the controller body of the controller according to the first embodiment of the present invention.

FIG. 11 is a block diagram of the conventional controller with an expansion unit connected to.

BEST MODE FOR CARRYING OUT THE PRESENT INVENTION

A First Embodiment

Figure 1:
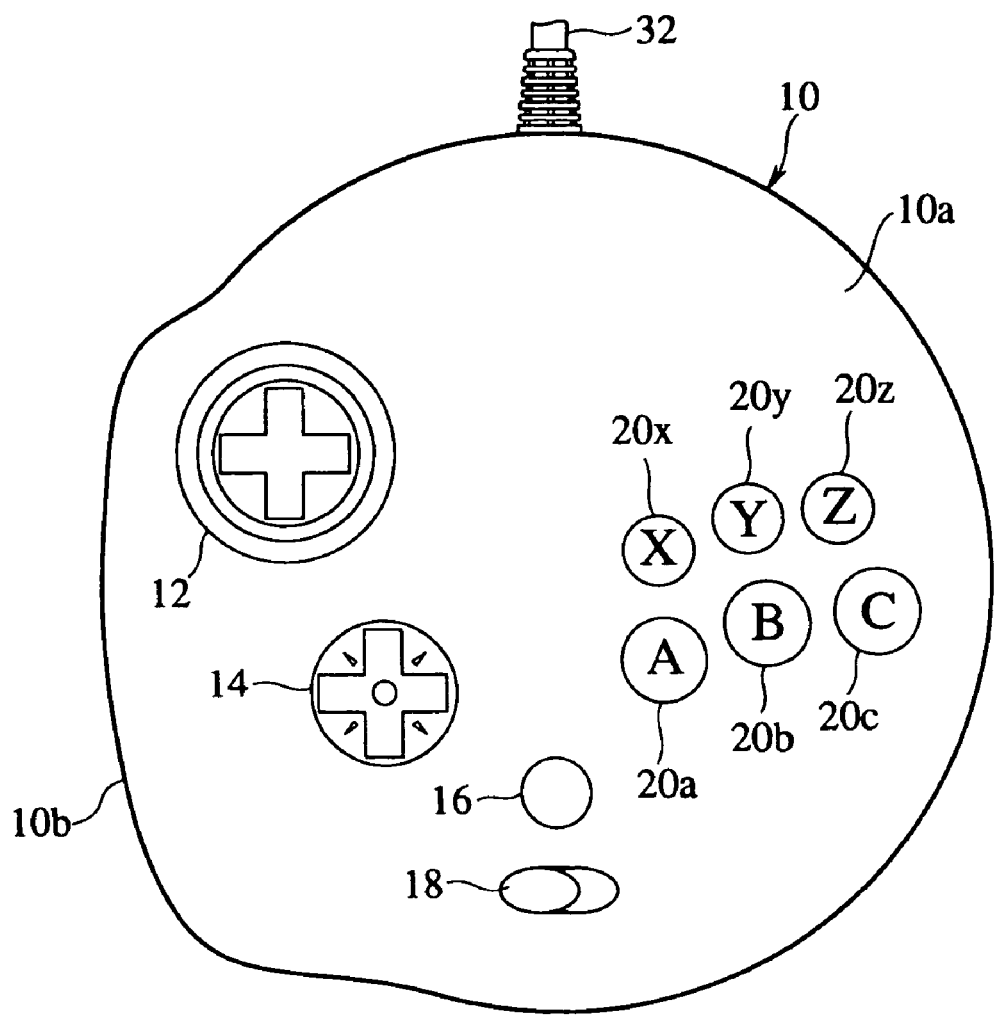
FIG. 1 is a plan view of the controller according to a first embodiment of the present invention.
Figure 2:
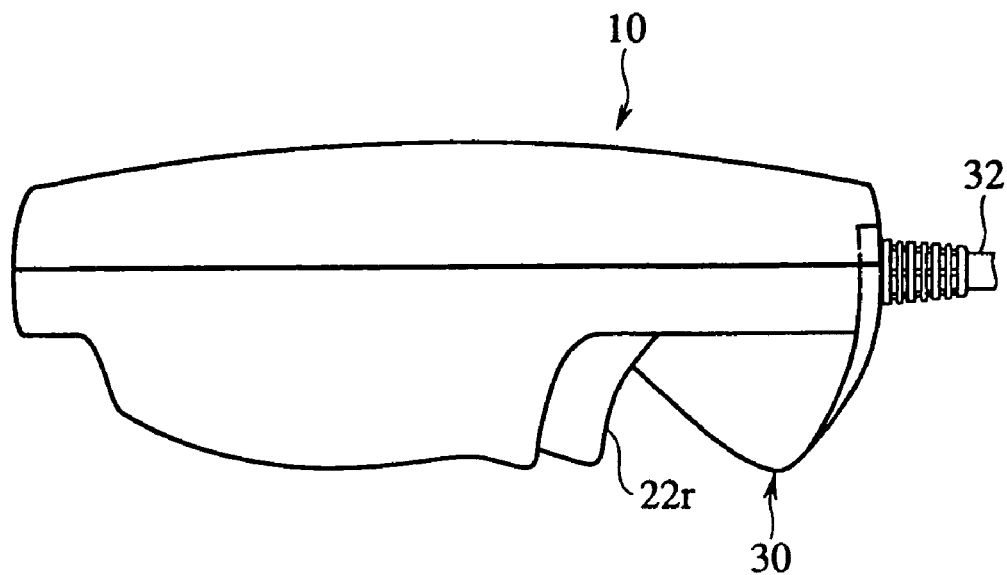
FIG. 2 is a right side view of the controller according to the first embodiment.
Figure 3:
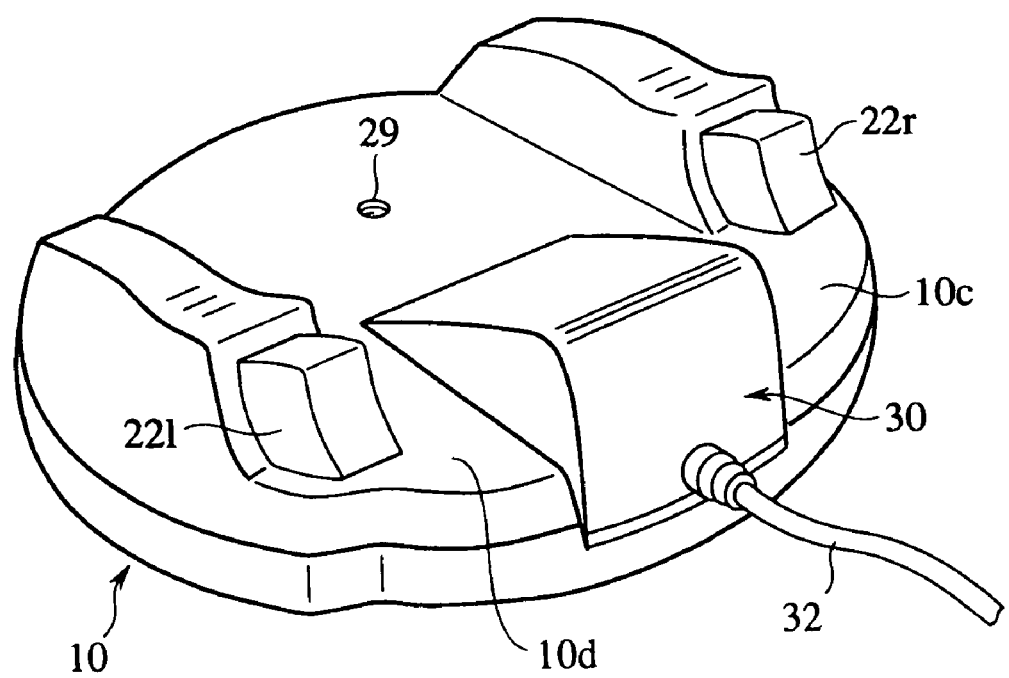
FIG. 3 is a perspective view of the back side of the controller according to the first embodiment as slantly viewed.
Figure 4:
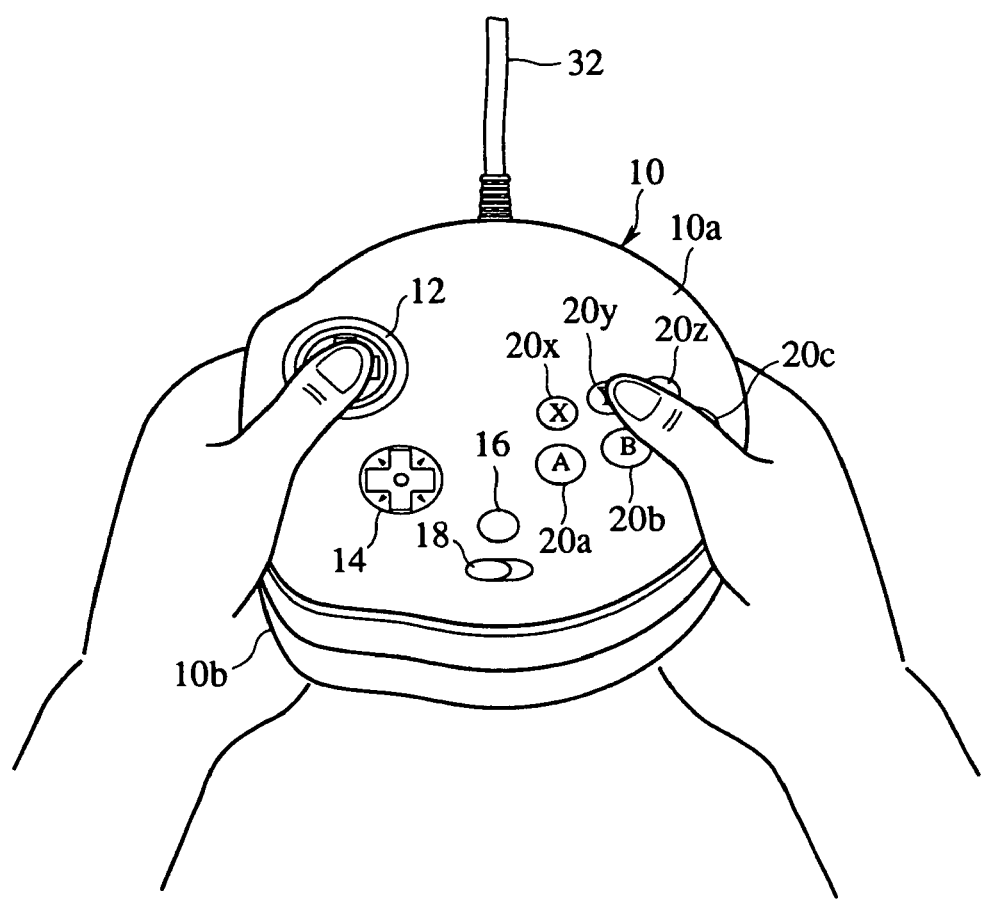
FIG. 4 is a perspective view of the controller according to the first embodiment in a state in which the controller is held by an operator.
Figure 5:
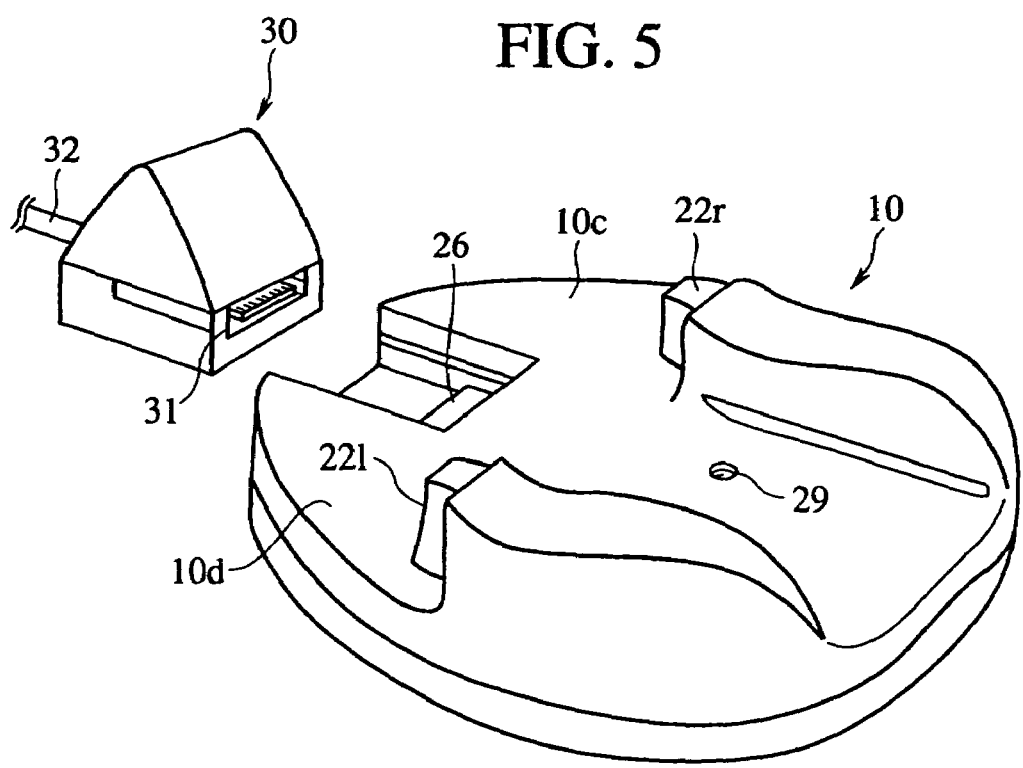
FIG. 5 is a rear side view of the controller according to the first embodiment of the present invention with an expansion unit is detached from the controller body.

The controller according to a first embodiment of the present invention will be explained with reference to FIGS. 1 to 34. FIG. 1 is a plan view of the controller according to the present embodiment. FIG. 2 is a right side view of the controller according to the present embodiment. FIG. 3 is a perspective rear side view of the controller according to the present embodiment as slantly viewed. FIG. 4 is a perspective view of the controller according to the present embodiment, which shows a way in which an operator holds the controller. FIG. 5 is a perspective rear side view of the controller according to the present embodiment in a state where the expansion unit are detached from the controller body. FIG. 6 is views of pin arrangements of a connector of the expansion unit and of an expansion socket of the controller body.

(Structure of the Controller)

The controller according to the present embodiment comprises a controller body 10 and an expansion unit 30.

The controller body 10 provides basic functions of the controller. As shown in FIG. 1, a start button 16 and a change-over switch 18 are disposed at a central lower part of an operation side 10a on the front side of the controller body 10, an analog direction key 12 and a digital direction key 14 are disposed on the left side of the operation face 10a, and six command buttons 20x, 20y, 20z, 20a, 20b, 20c are disposed on the right side of the operation face 10a. A command lever 22l is disposed on the central left side of an operation side 10c on the back side of the controller body 10, and a command lever 22r is disposed on the central right side of the operation side 10d. A screw hole 29 for screwing is formed in the center of the back side of the controller body 10.

As described above, the controller according to the present embodiment has the analog direction key 12, the digital direction key 14, the start button 16, the change-over switch 18 and the command buttons 20x, 2y, 20z, 20a, 20b, 20c on the operation side 10a on the front side, and the command levers 22l, 22r respectively on operation sides 10c, 10d on the back side.

The start button 16 is of the type that one command can be inputted with one push. The start button 16, which is disposed at the central lower part of the operation side 10a, is difficult to press frequently, and is mainly used to give commands that are not used during a game, such as the start command.

The change-over switch 18 is provided for ensuring compatibility with conventional controllers. When the change-over switch 18 is slid to the left, the compatible mode which is the same as the conventional controllers is available. In this mode, the analog direction key 12 is invalid while the digital direction key 14, the start button 16, the command buttons 20x, 20y, 20z, 20a, 20b, 20c and the command levers 22l, 22r are valid. Games which are played by the use of the conventional controllers can be played by the use of the innovative controller according to the present embodiment. When the change-over switch 18 is slid to the right, the analog direction key 12 is valid, and games which are played by the use of the innovative controller according to the present embodiment can be played.

The present embodiment includes two direction keys 12, 14. The analog direction key 12 commands all continuous directions over 360°, thus making the so-called analog direction commands. The digital direction key 14 commands 8 separate preset directions, thus making the so-called digital direction commands. Both direction keys 12, 14, which are disposed on the left side of the front operation side 10a, are usually operated with the left hand of a player.

The analog direction key 12 has an operation plate (not shown) which is free to tilt by operations of a player. Based on the tilt direction of the operation plate, a command direction is detected.

The digital direction key 14 has an operation plate (not shown) which is free to tilt by operations of a player. When the operation plate is tilted, switches (not shown) disposed on the upper, lower, left and right sides of the plate are pressed to detect 8 directions including the upper and lower directions, the left and right directions and the intermediate directions therebetween.

The command buttons 20x, 20y, 20z, 20a, 20b, 20c are of the type that one command is inputted by one push of one of the buttons. The buttons 20x, 20y, 20z 20a, 20b, 20c, which are disposed on the right side of the operation side 10a on the front side, are usually operated with the thumb of the right hand of an operator.

The command levers 22l, 22r are pulled toward the operator to input continuously changing command signals. The command levers 22l, 22r, which are disposed on the operation sides 10c, 10d on the left and right sides of the back side, are operated by pulling them toward the operator with the fingers of both hands except the thumbs, e.g., with the index fingers and the middle fingers when the operator holds the controller with both hands.

The command levers 22l, 22r respectively include operation levers (not shown). The command levers 22l, 22r are operated to thereby swing the operation levers, and can output continuously changing command signals corresponding to swing angles of the operation levers.

As shown in FIG. 3, the expansion unit 30 is mounted on the center of the back side of the controller body 10. The command levers 22l, 22r are disposed on the operation sides 10c, 10d on the left and the right sides of the expansion unit 30.

As shown in FIG. 1, the controller body 10 has a substantially circular shape which is defined by an outer edge about 13 cm in diameter of the operation side 10a. This suitably sized circular edge allows a player to comfortably grip the controller at any position around the outer edge of the operation side 10a. To enable an operator to comfortably operate the controller, it is preferred that the circular shape of the operation side 10a of the controller body 10 has a diameter of about 9-17 cm.

The outer edge of the operation side 10a of the controller body 10 defines the substantially circular shape but defines a larger-radius arc on the left side 10b of the analog direction key 12. In the present embodiment, the arc has a diameter of about twice the diameter of the circular shape of the operation side 10a, i.e., an about 26 cm in diameter, and has an arc length of about 8.5 cm. A direction of the arc on the left side 10b substantially agrees with a specific direction (upward direction in FIG. 1) of the analog direction key 12. Accordingly when a player holds the controller body 10, he can know the upward direction of the analog direction key 12 by the touch of his palms, and can play a game without looking at the controller. To enable a player to comfortably operate the controller, it is preferable that the arc of the left side 10b has a diameter of about 18-34 cm and an arc length of about 6-11 cm.

When a player operates the controller according to the present embodiment, gripping it with the hands, as shown in FIG. 4, the edge of the operation side 10a of the controller 10 is held with both hands. To enable a player to comfortably hold the controller with both hands, it is preferable that the controller body 10 has an about 2-4 cm-thickness, and the parts of the controller body 10 where the command levers 22l, 22r are disposed have an about 4-8 cm-thickness, which is about twice the thickness of the controller body 10.

When a player grips the controller with both hands, the thumb of the left hand operates the analog direction key 12 or the digital direction key 14 on the front side, and the index or middle finger of the left hand operates the command lever 22l on the back side, while the thumb of the right hand operates the command buttons 20x, 20y, 20z, 20a, 20b, 20c on the front side, and the index or middle finger of the right hand operates the command lever 22r on the back side.

When the analog direction key 12 and the digital direction key 14 are operated, as shown in FIG. 4, the left side 10b is gripped by the left hand with the arcuate portion of the left side 10b held by the palm of the left hand, whereby direction commands can be made, with a reference direction of the analog direction key 12, kept in mind.

Especially, since the analog direction key 12 does not respond with click touch, as does the digital direction key 14, a player will be at a loss as to his operation direction without the left side 10b. Thus it is very significant to provide the left side 10b with the curved portion having a large diameter.

As to the digital direction key 14, although it is possible to know a command direction of the digital direction 14 based on click touch alone, the presence of the flat left side 10b ensures that a player knows his operation direction without failure.

As shown in FIG. 3, the expansion unit 30 is mounted in the center of the back side of the controller body 10. The expansion unit 30 is inserted between the controller 10 and the game device 200, and supplies command signals from the controller body 10 produced by operating the various operation keys on the controller body 10. The expansion unit 30 is removable from the controller body 10 to be replaced as required.

The controller with the expansion unit 30 mounted on has the central portion of the controller body 10 projected as shown in FIG. 3. Controllers are usually handled roughly. When the controller is dropped or hit against other objects, the command levers 22l, 22r are disposed on the operation sides 10c, 10d which are hollows by the expansion unit 30 projected from the back side of the controller body 10 to be protected from direct impacts.

FIG. 5 shows the controller body 10 with the expansion unit 30 removed therefrom. The expansion unit 30 has a male connector 31 on the end to be connected to the controller body 10, and the controller body 10 has a female connector 26 for expansion on the rear side of the controller body 10. The connector 26 for expansion is the end of a circuit substrate (not shown) disposed inside the controller. When the expansion unit 30 is mounted, the male connector 31 is connected to the female connector 26 for expansion of the controller body 10.

Figure 6A:
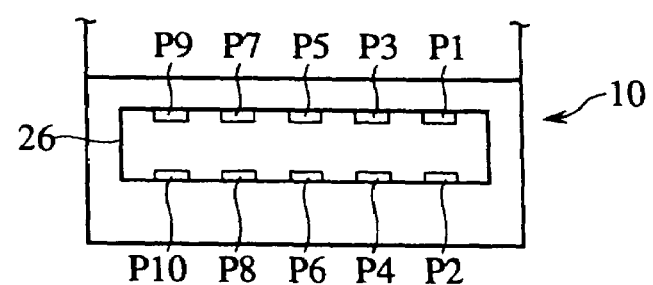
FIG. 6 is detailed views of an expansion connector of the controller body of the controller, and a connector of an expansion unit.
Figure 6B:
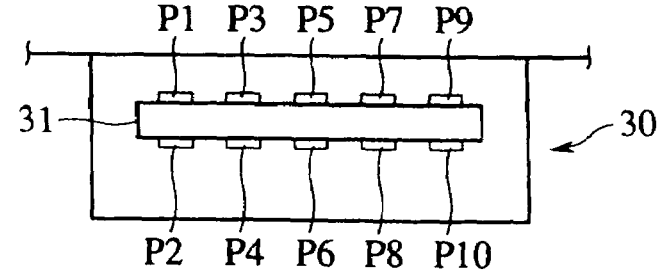

As shown in FIG. 6B, the connector 31 of the expansion unit 30 has the shape of a male connector and includes 10 pins P1-P10. The upper row of the pins includes, from the left, a first pin P1, a third pin P3, a fifth pin P5, a seventh pin P7, and a ninth pin P9, and the lower row of pins includes, from the left, a second pin P2, a fourth pin P4, a sixth pin P6 and tenth pin P10.

The connector 26 for expansion of the controller body 10 has the shape of a female connector as shown in FIG. 6A and includes to rows of pins. The upper row of the pins includes, from the left, a ninth pin P9, a seventh pin P7, a fifth pin P5, and a third pin P3 and a first pin P1, and the lower row of the pins includes, from the left, a tenth pin P10, an eighth pin P8, a sixth pin P6, a fourth pin P4, and a second pin P2.

(Function of the Controller)

Figure 7:
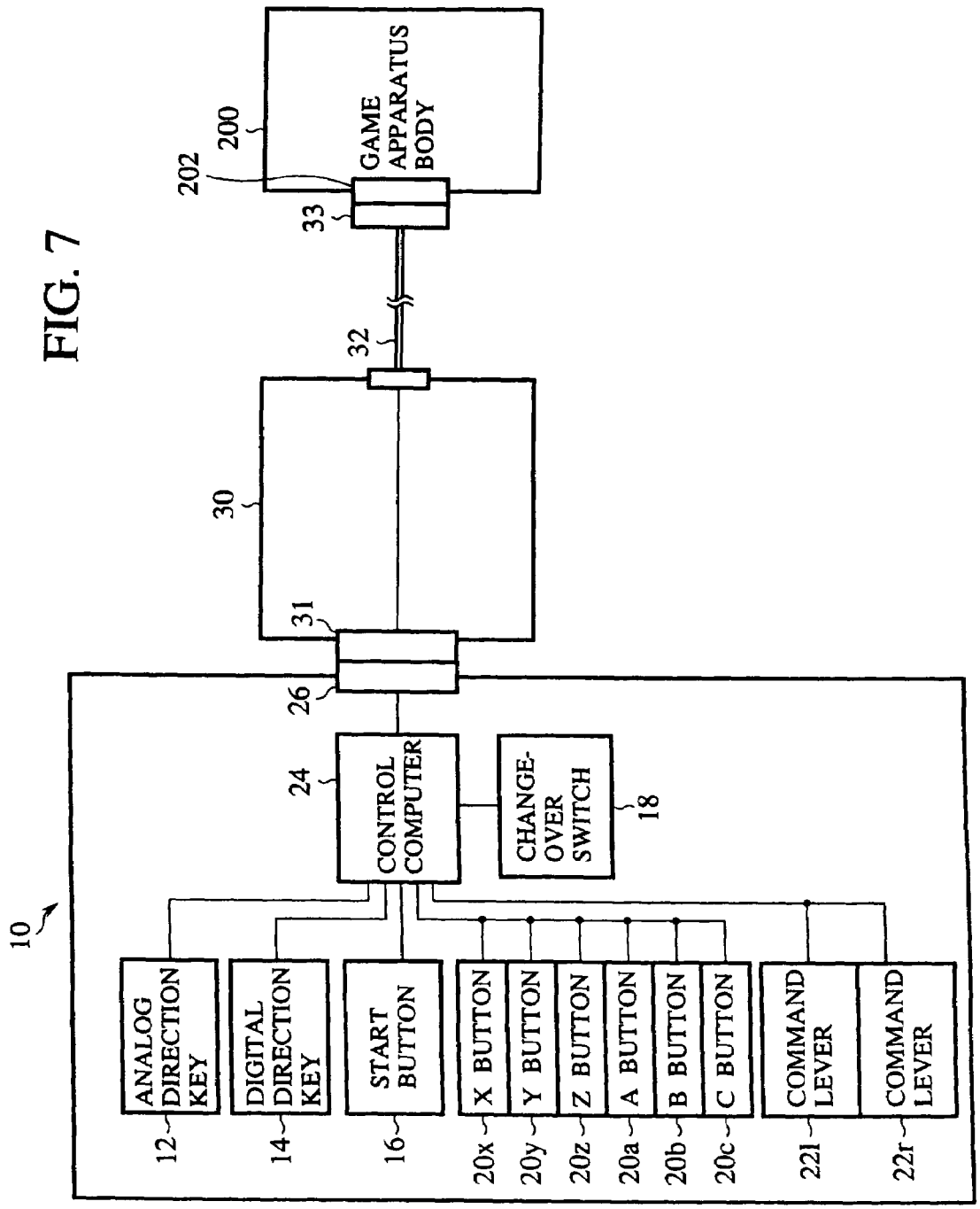

Next, the function of the controller according to the present embodiment will be explained with reference to FIGS. 7 and 8. FIG. 7 is a block diagram containing an expansion unit 30 mounted on, having no additional expansion functions, and FIG. 8 is a block diagram containing a expansion unit 40 mounted on, having additional expansion functions.

As shown in FIGS. 7 and 8, the controller body 10 includes a control computer 24 for general control. The control computer 24 detects operation signals from the analog direction key 12, the digital direction key 14, the start button 16, the command buttons 20x, 20y, 20z, 20a, 20b, 20c and the command levers 22l, 22r, and outputs the operation signals in accordance with the operation mode selected by the changeover switch 18. The controller body 10 includes an expansion connector 26 for connecting the expansion unit 30.

As shown in FIG. 7, the expansion unit 30, which adds no expansion functions, includes a connector 31 for connecting the expansion unit 30 to the controller body 10, and a signal line from the connector 31 is connected to a connection cable 32. A connector 33 to be connected to the connector 202 of the game apparatus body is provided at the end of the connection cable 32.

The expansion unit 30 is inserted between the controller body 10 and the game apparatus body 200 and outputs command signals as they are received from the controller body 10 to the game apparatus body 200.

As shown in FIG. 8, the expansion unit 40, which adds expansion functions, includes the control computer 44 for general control, which is connected to a function expansion unit 45 for realizing functions to be expanded. The expansion unit 40 includes a connector 41 for connecting to the expansion connector 26 of the controller body 10 as does the standard expansion unit 30, and a connector 43 to be connected to a connector 202 of the game apparatus body 200 is provided on the end of the connection cable 42.

The expansion unit 40 is inserted between the controller body 10 and the game apparatus body 200, and the control computer 44 adds command signals expanded by the function expansion unit 45 to command signals from the controller body 10 and outputs them to the game apparatus body 200.

FIG. 9 shows a pin arrangement of the connector 41 of the expansion unit 40, and a pin arrangement of the expansion unit 26 of the controller body 10.

For both connectors 41, 26, the fourth fin P4, the fifth pin P5, and the sixth pin P6 are used mainly as control lines. The fourth pin P4 is used as the control line for select signals (TH) from the expansion unit 40 to the controller body 10, the fifth pin P5 is used as the control line for request signals from the expansion unit 40 to the controller body 10, and the sixth pin P6 is used as the control line for response signals (TL) from the controller body 10 to the expansion unit 40.

The seventh pin P7, the eighth pin P8, the second pin P2, and the third pin P3 are used mainly as data lines. The seventh pin P7 is used as the data line for 3-bit data signals (R), the eighth pin P8 is used as the data line for 2-bit data signals (L), the second pin P2 is used as the data line for 1-bit data signals (D), and the third pin P3 is used as the data line for 0-bit data signals (U).

Furthermore, the first pin P1 is used as an electric power source line (VCC), and the third pin P3 is used as a grounding line (GND).

Then, with reference to FIG. 10, conversion of command signals from the controller body by the expansion unit will be explained.

Figure 10A:
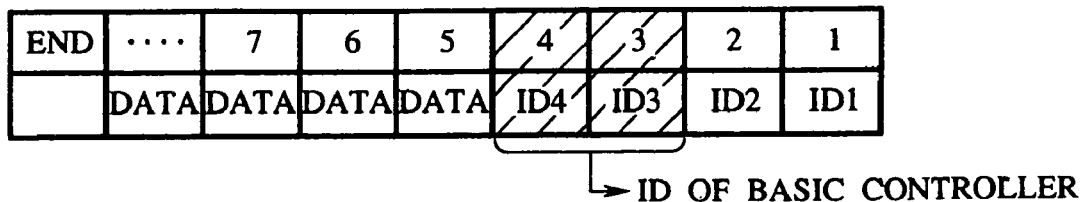
FIG. 10 is explanatory views of conversion of command signals from the controller body which is conducted by the expansion unit according to the first embodiment of the present invention.

As shown in FIG. 10A, each of the command signals from the controller body 10 include identification codes ID1-ID4, and data DATA following the identification codes ID1-ID4, and an end code END which indicates the end of the command signals.

In the case of FIG. 7 in which the expansion unit 30 having no expansion functions is connected, command signals shown in FIG. 10A are outputted as they are to the game apparatus body 200. The game apparatus body 200 determines the type of the connected controller, based on the identification codes ID1-ID4 and receives the following data signals DATA.

Figure 10B:
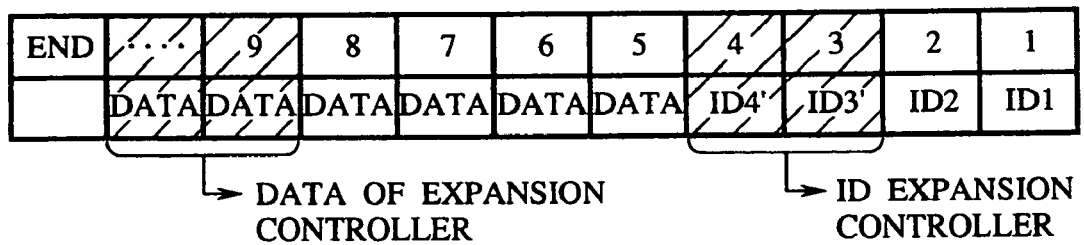

In the case of FIG. 8 in which the expansion unit 40 having expansion functions is connected, the command signals shown in FIG. 10A are outputted by the controller body 10, but the identification codes ID3, ID4 are changed by the control computer 44 of the expansion unit 40 to controller identification codes ID3', ID4', as shown in FIG. 10B, which identify the controller as having expansion functions. The game apparatus 200 determines the type of the connected controller, based on the identification codes ID1-ID4' and receives the data signals DATA.

Figure 10C:
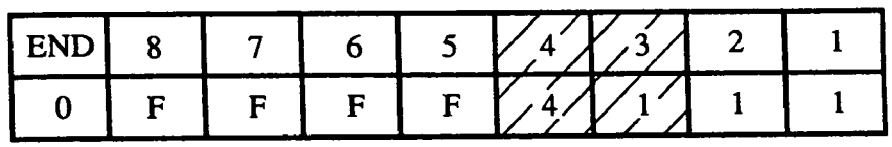
Figure 10D:
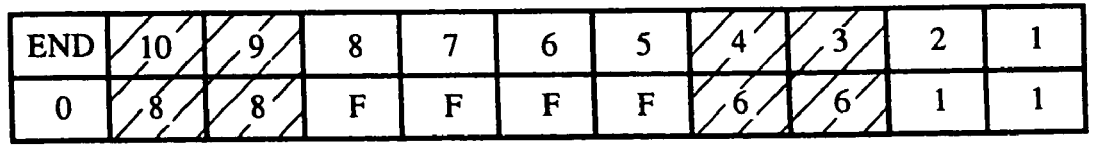

FIGS. 10C and 10D show examples of the command signal changing process. The controller body 10 outputs identification codes [1114] and data [FFFF] following the identification codes as shown in FIG. 10C, and the control computer 44 changes the identification signals to identification signals [1166] and adds data [88] after the data [FFFF] as shown in FIG. 10D.

The advantages of the expansion unit for the controller according to the present embodiment will be explained in comparison of the block diagram of the controller according to the present embodiment shown in FIGS. 7 and 8 to the block diagram of the conventional controller shown in FIG. 11.

Figure 11:
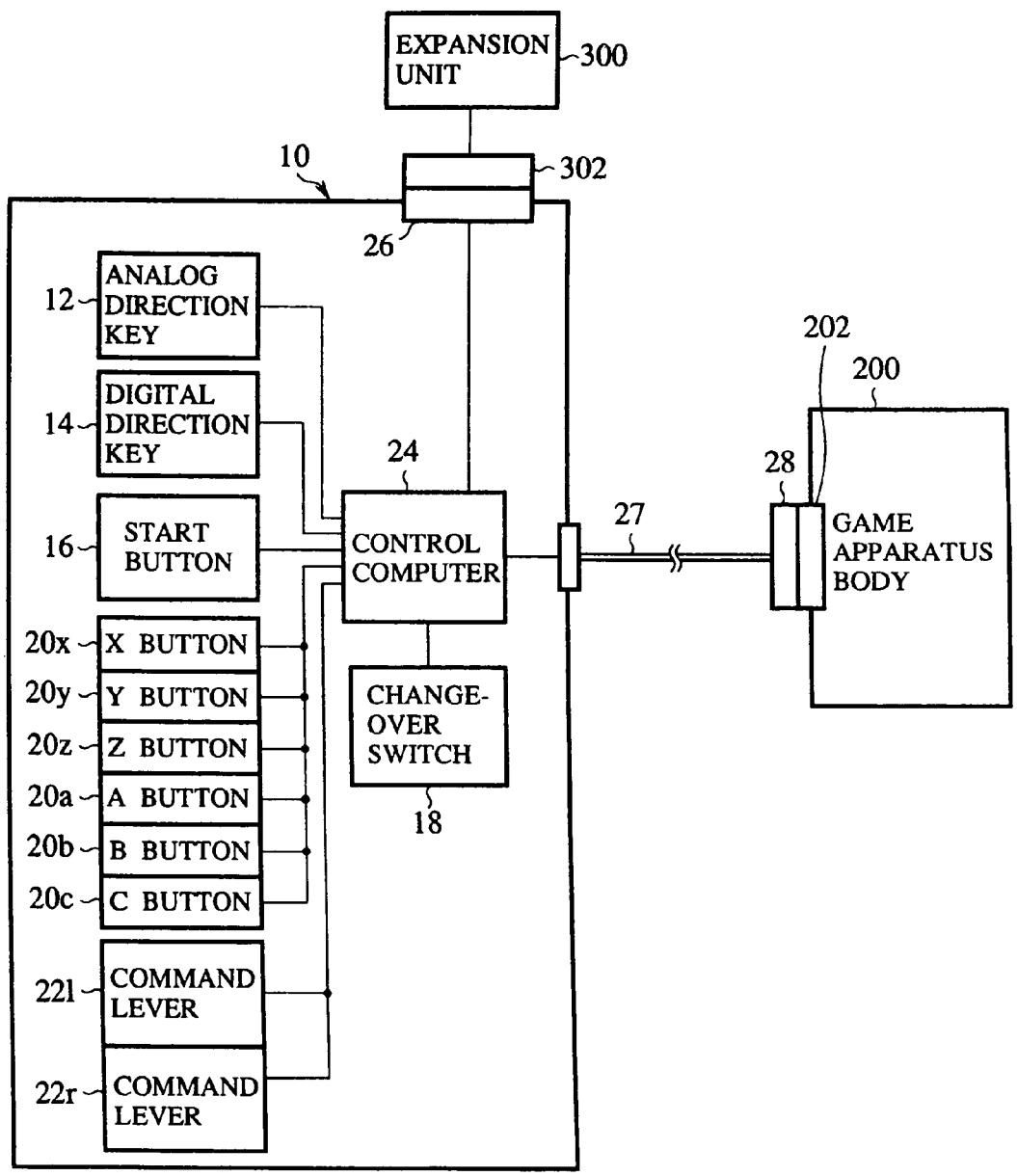

In the conventional controller, as shown in FIG. 11, the connector 28 is disposed on the end of the connection cable 27 of the controller body 10, and the connector 18 is connected to the connector 202 of the game apparatus body 200. The expansion connector 26 is provided independently of the connection cable 27 for connection of the expansion unit 300, and the expansion connector 26 is connected to the control computer 24. The connector 302 of the expansion unit 300 is connected to the expansion connector 26 to connect the expansion unit 300 to the controller body 10.

The expansion unit of the conventional controller is connected to the controller computer 24 and is under the control thereof as described above. To this end it is necessary that the control computer 24 knows in advance details of functions of the expansion unit 300 connected to the expansion connector 26, e.g., identification numbers, etc. indicative of the connected expansion functions. This is because it is necessary that when the expansion unit 300 is connected, a type, etc. of the expansion unit 300 are supplied to the game apparatus body 200 through the connection cable 27. That is, conventionally a connectable type of the expansion unit 300 must be determined when the controller body 10 is designed, and the expansion unit 300 of a type other than the intended type when originally designed can not be connected.

In contrast to the conventional controller arrangement, in the present embodiment, as shown in FIG. 8, the expansion unit 40 is inserted between the controller body 10 and the game apparatus body 200, and the expansion unit 40 processes command signals from the controller body 10 to supply the same to the game apparatus body 200. The control computer 24 of the controller body 10 only supplies its own command signals. This is because the control computer 44 of the expansion unit 40 conducts processing in connection with expansion functions of its own expansion unit 40. Accordingly, new functions which are not intended when the controller body 10 was designed can be optionally added.

Furthermore, the expansion unit for the controller according to the present embodiment is advantageous in comparison to the case where a new controller having new functions is designed and provided. In designing a new controller, basic command keys, such as direction keys, command keys, etc., are necessary for game operation and are absolutely necessary to retain compatibility with the concurrent controller. It is frequent cases that in addition to the basic command keys, such as direction keys and command buttons, etc., command keys for realizing new functions are added. To this end a new controller including the basic command keys must be redesigned, which makes a fast design impossible and adds to the design costs.

In contrast to this, in the present embodiment, the basic command keys are controlled by the controller body 10, so that the expansion unit can be designed in consideration of only new functions. This can reduce design costs and development time.

(Examples of the Expansion Unit)

Various examples of the expansion unit will be explained with reference to FIGS. 12 to 34.

(Cordless Expansion Unit)

Figure 12:
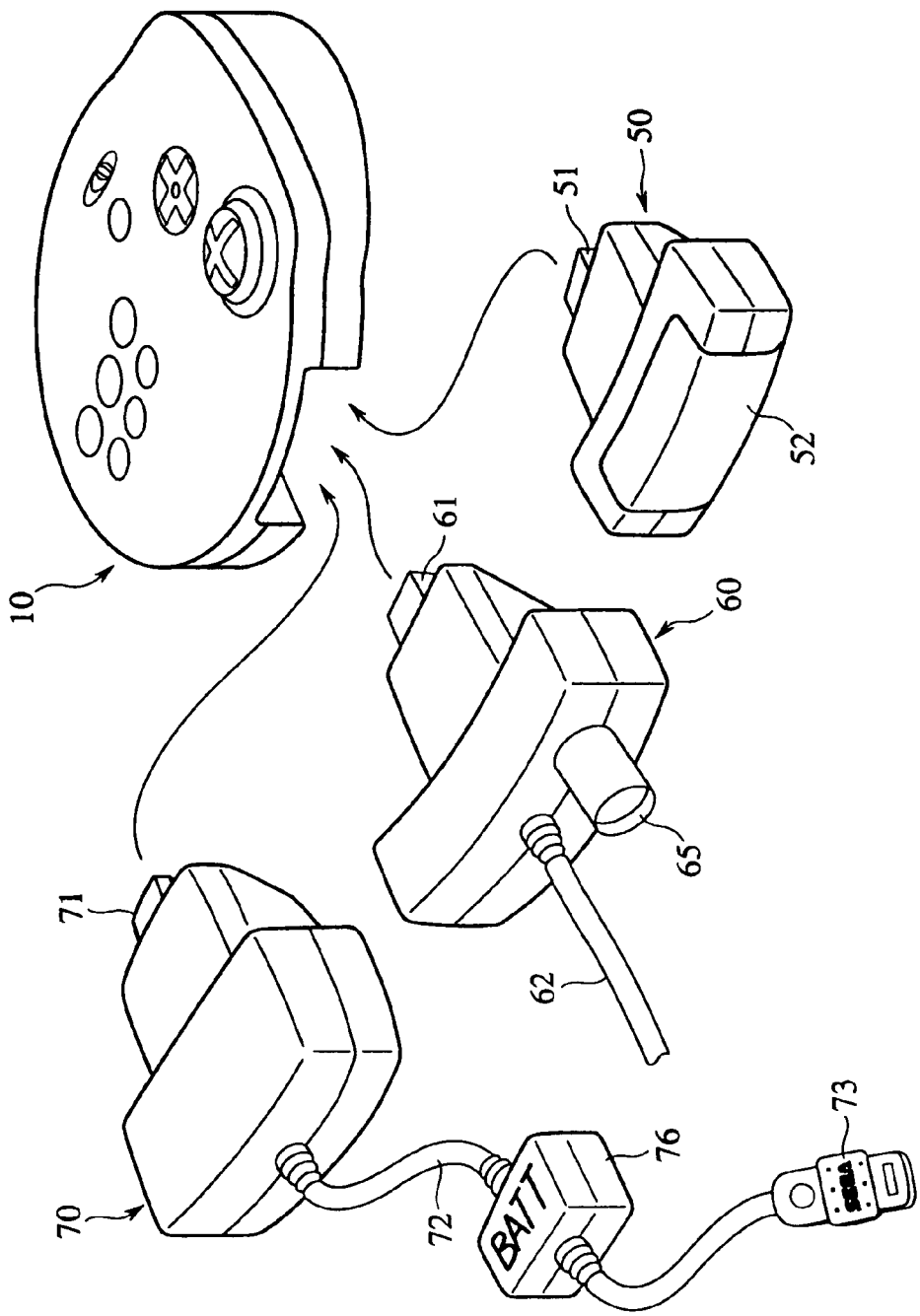
FIG. 12 is a perspective view of an example of the expansion unit for the controller according to the first embodiment of the present invention.
Figure 13:
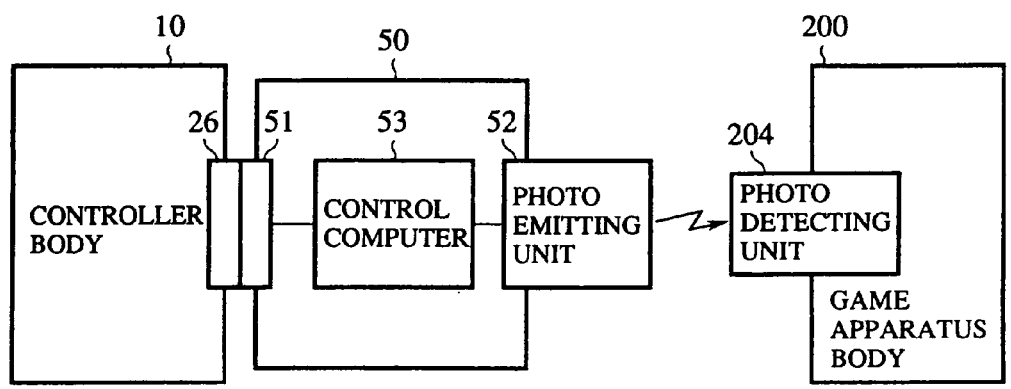
FIG. 13 is a block diagram of an example of the expansion unit for the controller according to the first embodiment of the present invention, which uses infrared ray signals.

An expansion unit 50 shown n FIGS. 12 and 13 realizes a cordless expansion unit by the use of infrared signals.

The expansion unit 50 which adds the cordless function includes a connector 51 to be connected to the expansion connector 26 of the controller body 10 jus as the standard expansion unit 30 is. The expansion unit 50 also includes a control computer 53 for general control, and the control computer 53 has a light emitting unit 52.

The control computer 53 outputs command signals from the controller body 10 as photo signals using the light emitting unit 52. A light detecting unit 204 of a game apparatus body 200 detects the photo signals from the light emitting unit 52 and decodes the photo signals into command signals.

The expansion unit is thus attached, whereby simply the controller is made cordless.

(Photo Signal Detecting Expansion Unit)

Figure 14:
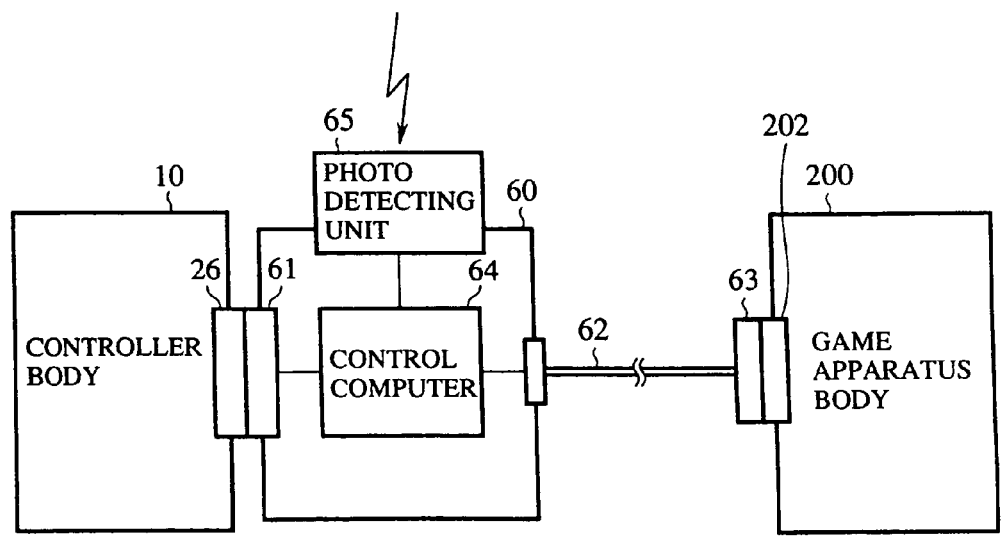
FIG. 14 is a block diagram of an example of the expansion unit for the controller according to the first embodiment of the present invention, which includes a photo detector.
Figure 15:
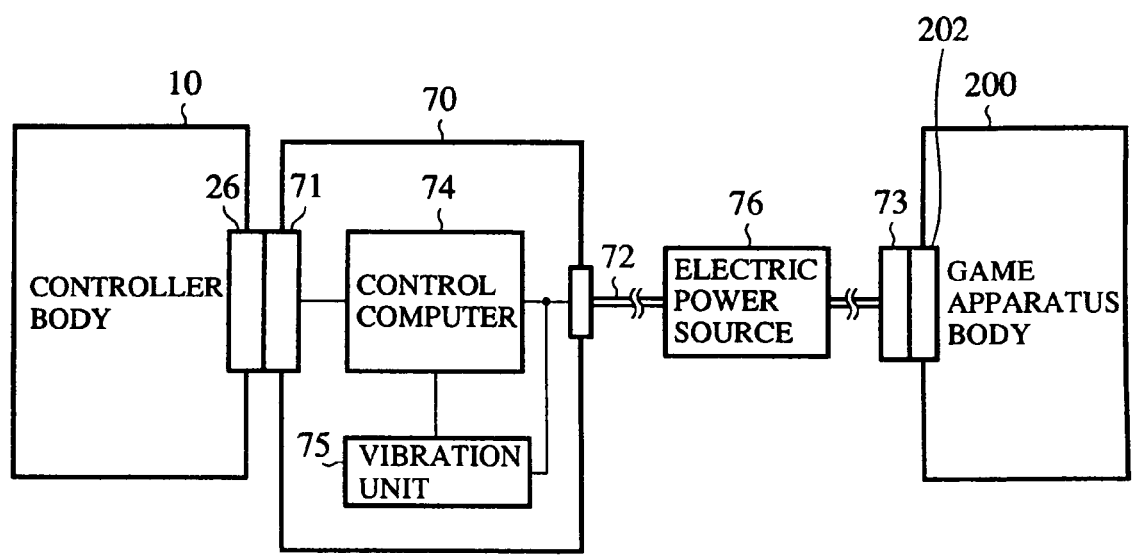
FIG. 15 is a block diagram of an example of the expansion unit for the controller according to the first embodiment of the present invention, which includes a vibration unit.

An expansion unit 60 shown in FIGS. 12 and 14 is for adding the function of detecting photo signals from the outside, e.g., the video monitor (not shown), The expansion unit 60 which adds the photo signal detecting function includes a connector 61 to be connected to the expansion connector 26 of the controller body 10 just as the standard expansion unit 30 is, and includes on the end of a connection cable 62 a connector 63 to be connected to a connector 202 of a game apparatus body 200. The expansion unit 60 includes a control computer 64 for the general control, and the control computer 64 includes a photo detector 65.

Signals detected by the photo detector 65 are added to command signals from the controller body 10 by the control computer 64 and supplied to a game apparatus body 200.

The photo detector 65 thus detects photo signals from the outside, e.g., video monitor, whereby shooting games in which enemies in monitor screens are shot can be played.

(Vibration Expansion Unit)

An expansion unit 70 shown in FIGS. 11 and 14 adds the function of giving vibrations to the controller body 10.

The expansion unit 70 which adds the vibration function includes a connector 71 to be connected to the expansion connector 26 of the controller body 10 just as the standard expansion unit 30 is, and a connector 73 to be connected to a connector 202 of a game apparatus body 200 is provided on the end of a connection cable 72. An electric power source 76 for giving vibrations is disposed in the connection cable 72. The expansion unit 70 includes a control computer 74 for the general control, and the control computer 74 includes a vibration unit 75 for giving vibrations.

The vibration unit 75 is actuated in response to a command signal from the game apparatus body 200 or the controller body 10 and gives vibrations to the controller body 10.

Vibrations are thus given to the controller body 10 from the vibration unit 75, whereby vibrations are given upon shooting, and realistic games can be enjoyed.

(Joy stick Expansion Unit)

Figure 16:
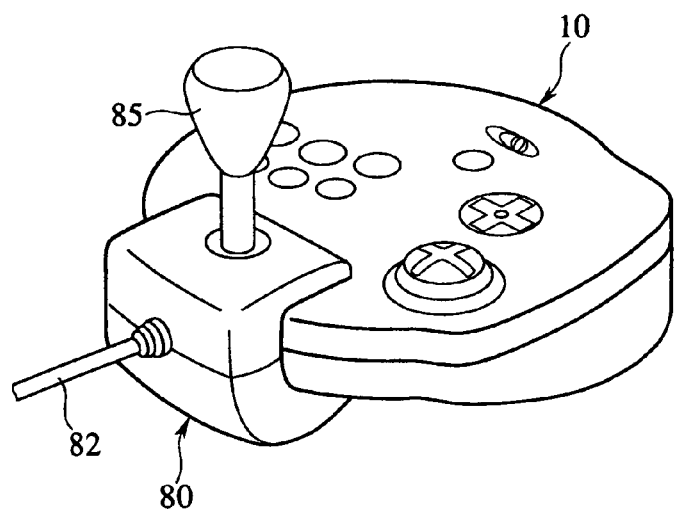
FIG. 16 is a perspective view of an example of the expansion unit for the controller according to the first embodiment of the present invention, which includes a joy stick.
Figure 17:
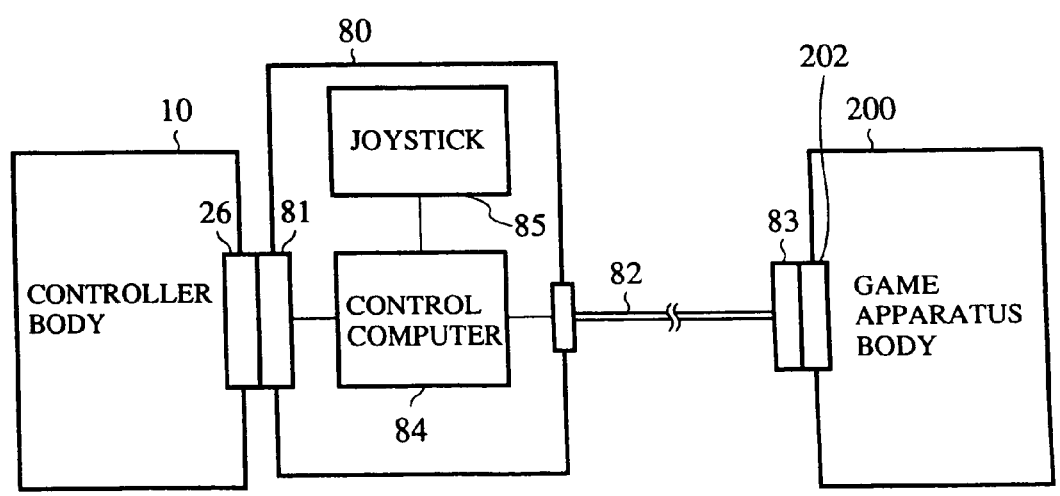
FIG. 17 is a block diagram of an example of the expansion unit of the controller according to the first embodiment of the present invention, including the joy stick.

An expansion unit 80 shown in FIGS. 16 and 17 adds a joy stick as a new operation key to the controller body 10.

In FIG. 16, the expansion unit 80 which adds the joy stick is attached to the rear side of the controller body 10. The expansion unit 80 includes a connector 81 to be connected to the expansion connector 26 of the controller body 10 just as the standard expansion unit 30 is, and a connector 83 to be connected to a connector 202 of a game apparatus body 200 is provided on the end of a connection cable 82. The expansion unit 80 includes a control computer 84 for the general control, and the control computer 84 includes the joy stick 85.

When a player operates the joy stick, operation signals are added to command signals from the controller body and are supplied to the game apparatus body 200.

The joy stick 35 is thus used as a new operation key, and operations can be made suitable for games.

Figure 18:
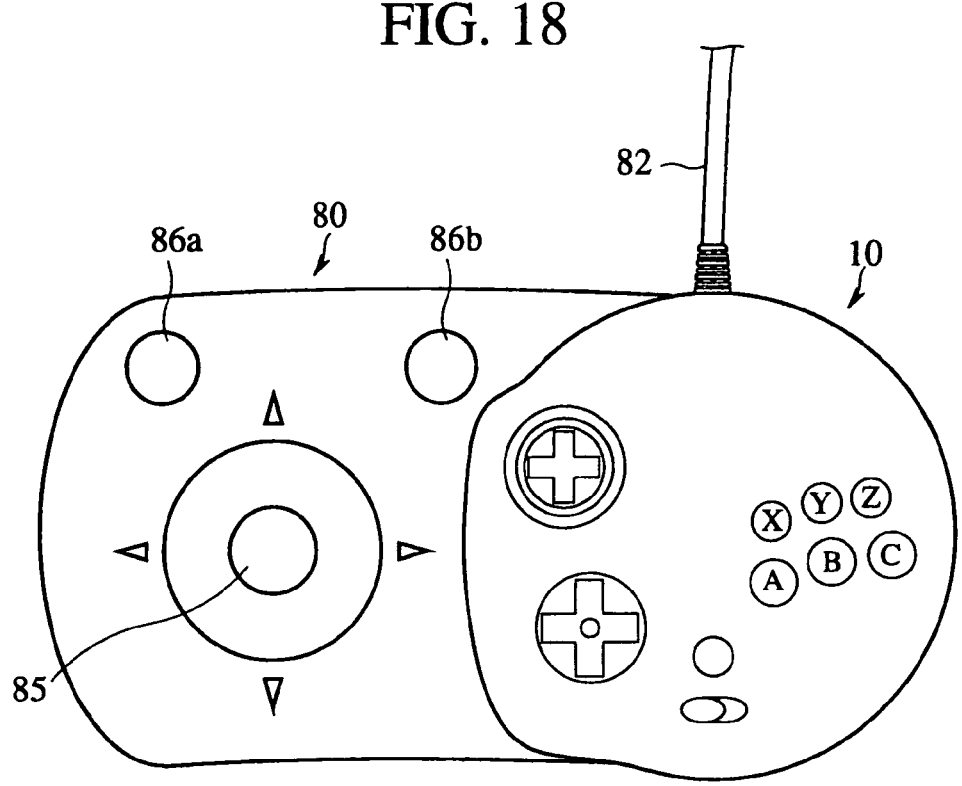
FIG. 18 is a plan view of another example of the expansion unit including a joy stick for the controller according to the first embodiment of the present invention.
Figure 19:
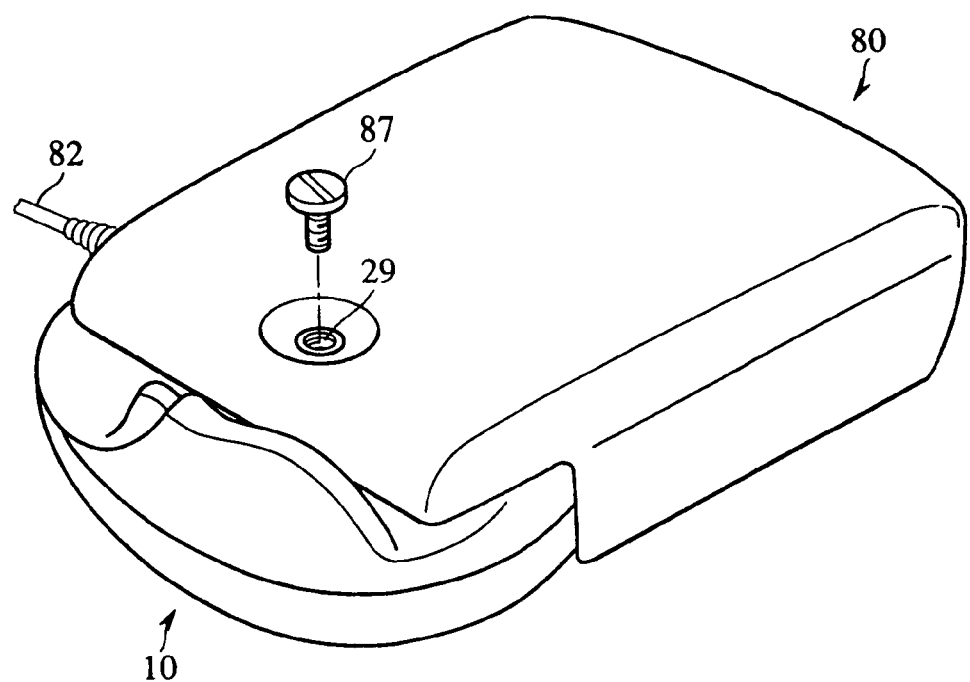
FIG. 19 is a perspective view of said another example of the expansion unit including the joy stick for the controller according to the first embodiment of the present invention.

In FIGS. 18 and 19, the expansion unit 80 which adds the joy stick is attached to the left side of the controller body 10.

The expansion unit 80 is secured to the controller body 10 by means of a screw hole 87 engaged in a screw hole 29 in the back side of the controller body 10. Command buttons 86a, 86b are provided above the joy stick 85 as viewed in FIG. 17.

When the expansion unit 80 is attached, the joy stick 85 is positioned on the left side of the analog direction key 12 and the digital direction key 14, which improves the ease of operation.

(Track Ball Expansion Unit)

An expansion unit 80 shown in FIGS. 20 to 23 adds a track ball as a new operation key to the controller body 10.

Figure 20:
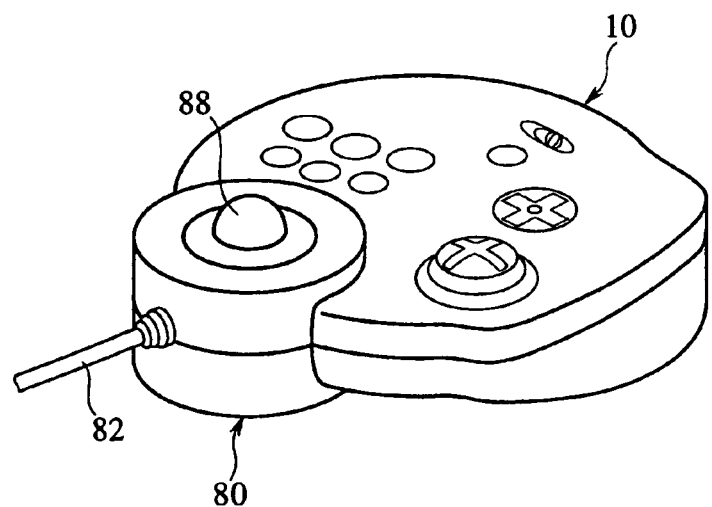
FIG. 20 is a perspective view of an example of the expansion unit including a track ball for the controller according to the first embodiment of the present invention.
Figure 21:
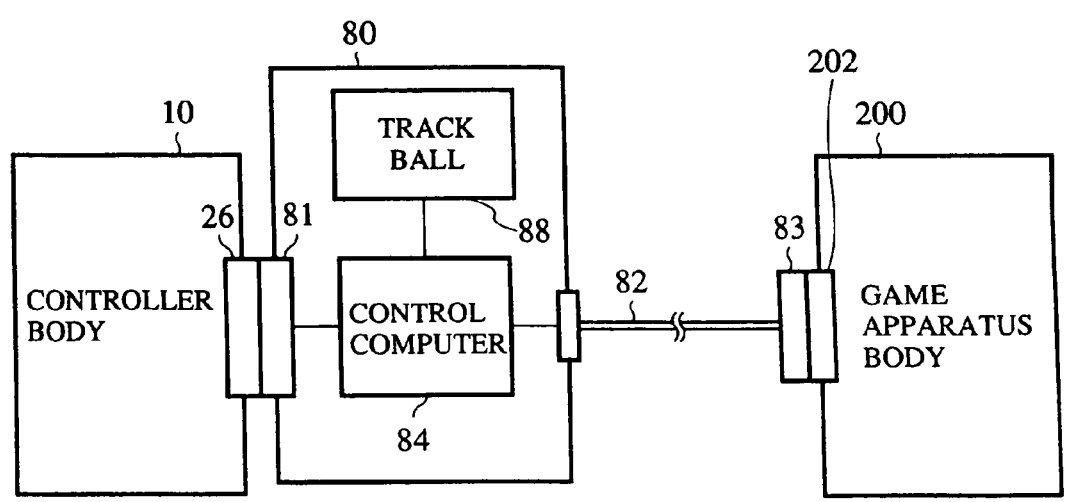
FIG. 21 is a block diagram of the example of the expansion unit including the track ball for the controller according to the first embodiment.

In FIG. 20, the expansion unit 80 which adds a tack ball is attached to the rear side of the controller body 10. The expansion unit 80 includes the tack ball 88 in place of the joy stick 85. When a player operates the track ball, operation signals are added to command signals from the controller body 10 and are supplied to a game apparatus body 200.

The track ball 88 is thus used as a new operation key to make operations suitable for games.

Figure 22:
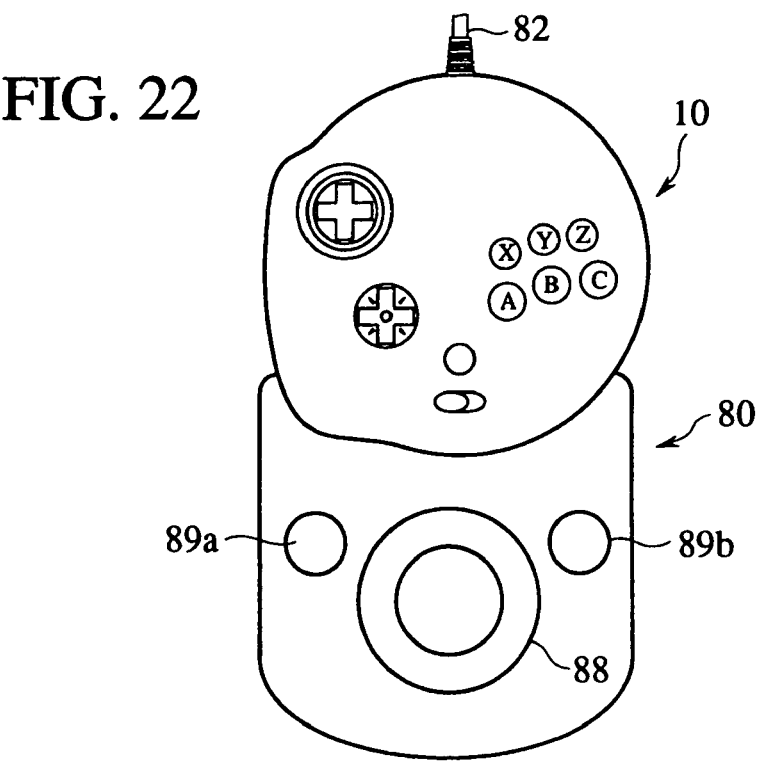
FIG. 22 is a plan view of another example of the expansion unit including the track ball for the controller according to the first embodiment of the present invention.
Figure 23:
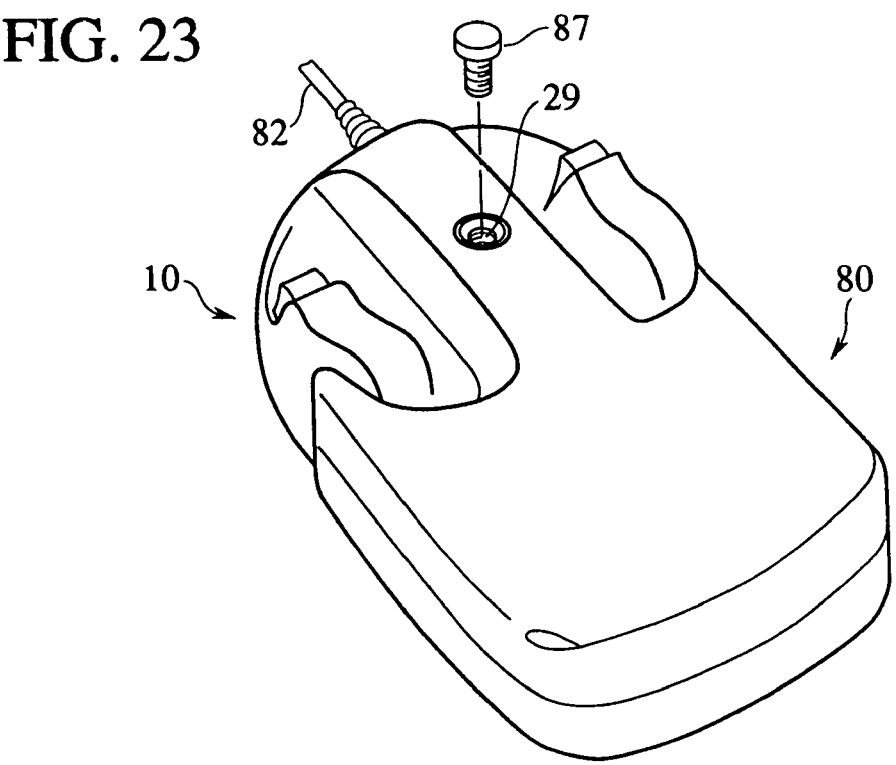
FIG. 23 is a perspective view of said another example of the expansion unit including the track ball for the controller according to the first embodiment of the present invention.

In FIGS. 22 and 23, the expansion unit 80 which adds a track ball is attached to the front side of the controller body 10.

The expansion unit 80 is secured to the controller body 10 by means of a screw 87 engaged in a screw hole 29 in the back side of the controller body 10. A decision button 89a and a cancel button 89b are provided above the track ball 88 as viewed in FIG. 22.

When the expansion unit 80 is thus attached, the track ball 88 is positioned in front of the controller body 10, which improves the ease of operation.

(Memory Expansion Unit)

Figure 24:
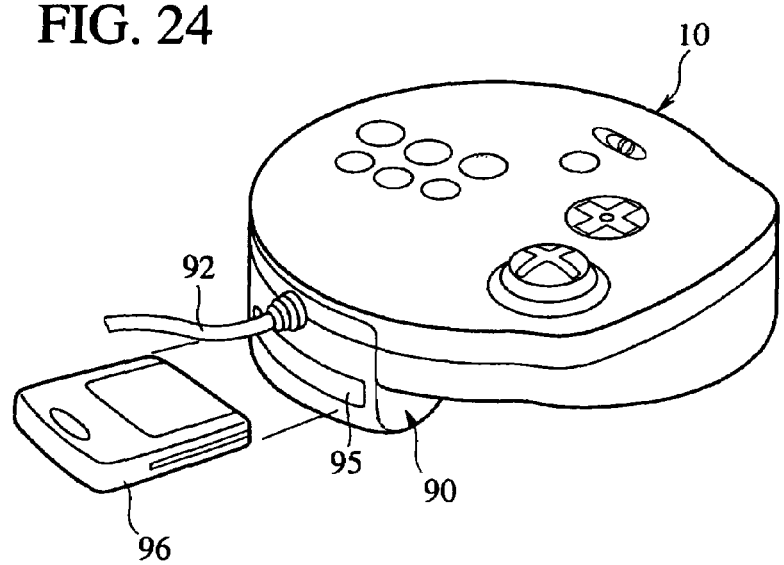
FIG. 24 is a perspective view of said another example of the expansion unit which adds a memory module to the controller according to the first embodiment of the present invention.
Figure 25:
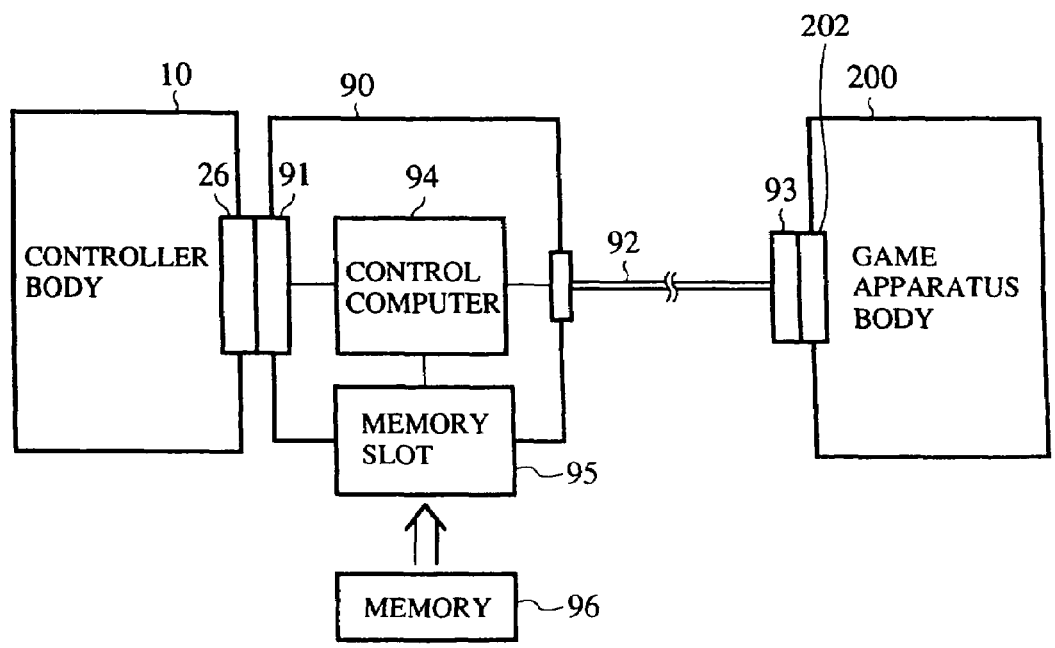
FIG. 25 is a block diagram of the example of the expansion unit which adds a memory module to the controller according to the first embodiment of the present invention.

An expansion unit 90 shown in FIGS. 24 and 25 adds a memory module 96 to the controller body 10.

The expansion unit 90 which adds the memory module 96 includes a connector 91 to be connected to the expansion connector 26 of the controller body 10, and a connector 93 to be connected to a connector 202 of a game apparatus body 200 is provided on the end of a connection cable 92. The expansion unit 90 includes a control computer 94 for the general control, and the control computer 94 includes a memory slot 95. The memory module 96 is engaged in the memory slot 95.

The memory module 96 can be used in various ways. For example, information from the game apparatus body 200 or the controller body 10 may be stored. In addition, information to the game apparatus body 200 or the controller body 10 may also be stored.

The memory is thus added, whereby functions of the game apparatus can be enhances.

(Display Expansion Unit)

Figure 26:
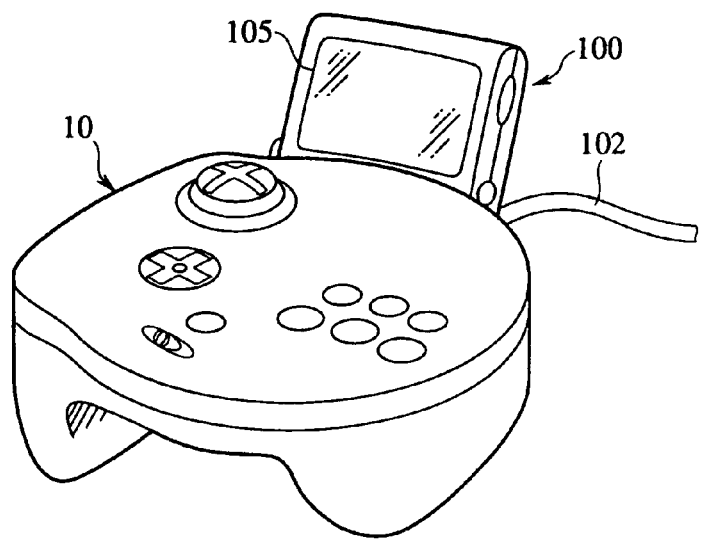
FIG. 26 is a perspective view of an example of the expansion unit including an image display for the controller according to the first embodiment of the present invention.
Figure 27:
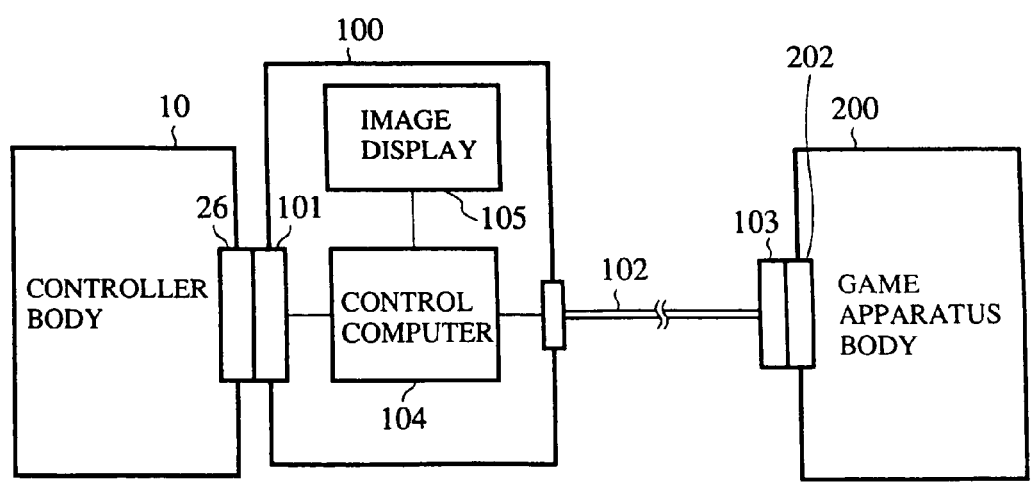
FIG. 27 is a block diagram of the example of the expansion unit including the image display unit for the controller according to the first embodiment of the present invention.

An expansion unit 100 shown in FIGS. 26 and 27 adds an image display unit 105 to the controller body 10.

The expansion unit 100 which adds the image display unit 105 includes a connector 101 to be connected to the expansion connector 26 of the controller body 10, and a connector 103 to be connected to a connector 202 of a game apparatus body 200 is provided on the end of a connection cable 102. The expansion unit 100 incudes a control computer 104 for the general control, and the control computer 104 includes the image display unit 105. As shown in FIG. 26, the image display unit 105 is positioned so it can be viewed by a player operating the controller body 10.

The image display unit 105 can be used in various ways. For example, the image display unit 105 may display information from either the game apparatus body 200 or the controller body 10.

The image display unit 105 is thus added, whereby functions of the game apparatus can be enhanced.

(Clock Expansion Unit)

Figure 28:
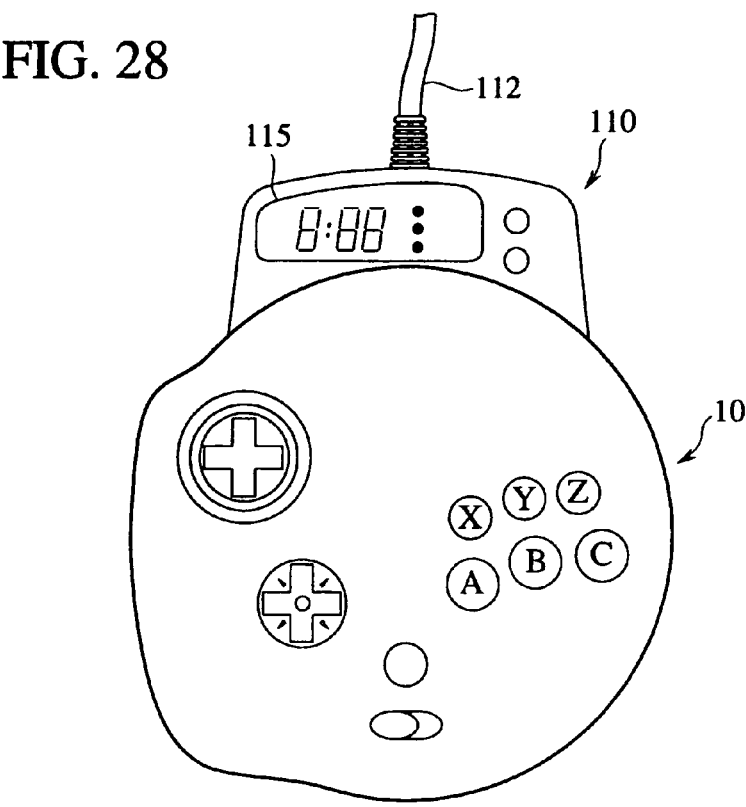
FIG. 28 is a plan view of an example of the expansion unit including a clock display unit for the controller according to the first embodiment of the present invention.
Figure 29:
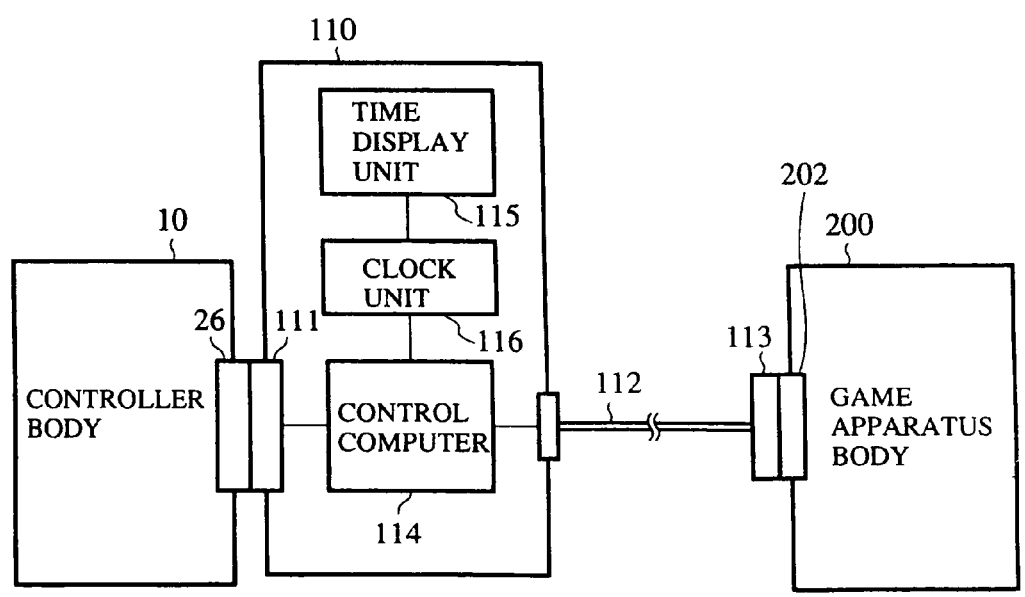
FIG. 29 is a block diagram of the example of the expansion unit including the time display unit for the controller according to the first embodiment of the present invention.

An expansion unit 110 shown in FIGS. 28 and 29 adds a clock function to the controller body 10.

The expansion unit 110 for adding the clock function includes a connector 111 to be connected to the expansion connector 26 of the controller body 10 just as the standard expansion unit 30, and a connector 113 to be connected to the expansion connector 26 of the controller body 10 is provided on the end of a connection cable 112. The expansion unit 110 includes a control computer 114 for the general control. The control computer 114 includes a clock unit 116 for counting time and outputs a correct current time. The clock unit 116 includes a time display unit 115. The time display unit 115 display a current time, etc. outputted by the clock unit 116. As shown in FIG. 28, the time display unit 115 is positioned so it can be viewed by a player operating the controller body 10.

The clock unit 116 outputs to the game apparatus body 200 a current time, the length of time that the controller has been connected to the game apparatus body 200, the time when a game is started, etc., and can be used for timing event occurrences in a game.

The clock function is thus added, whereby functions of the game apparatus can be enhanced.

(Handle Expansion Unit)

Figure 30:
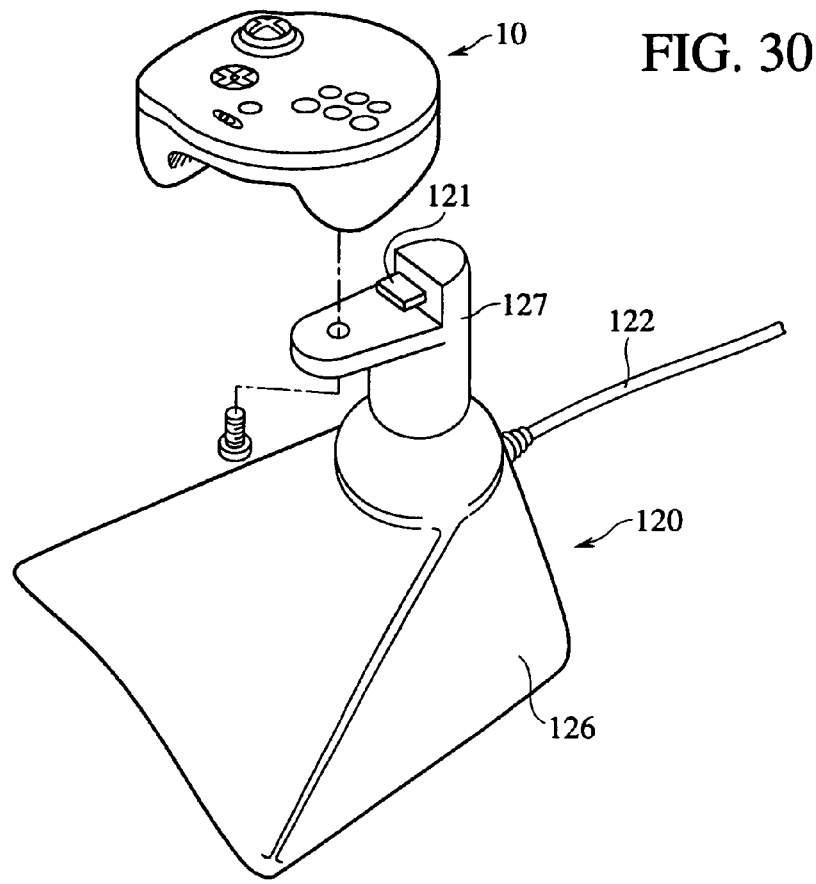
FIG. 30 is a perspective view of an example of the expansion unit including a handle shaft for the controller according to the first embodiment of the present invention.
Figure 31:
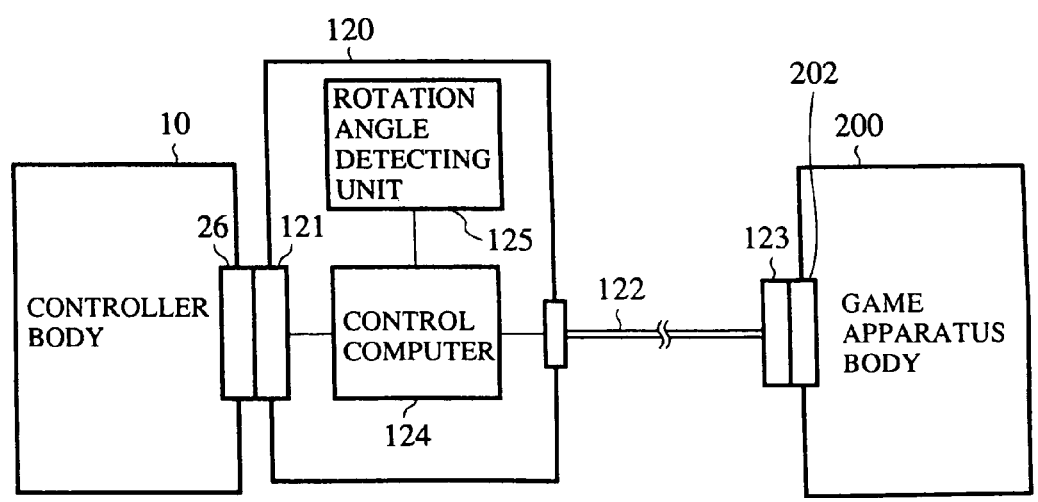
FIG. 31 is a block diagram of the example of the expansion unit including the handle shaft for the controller according to the first embodiment of the present invention.
Figure 32:
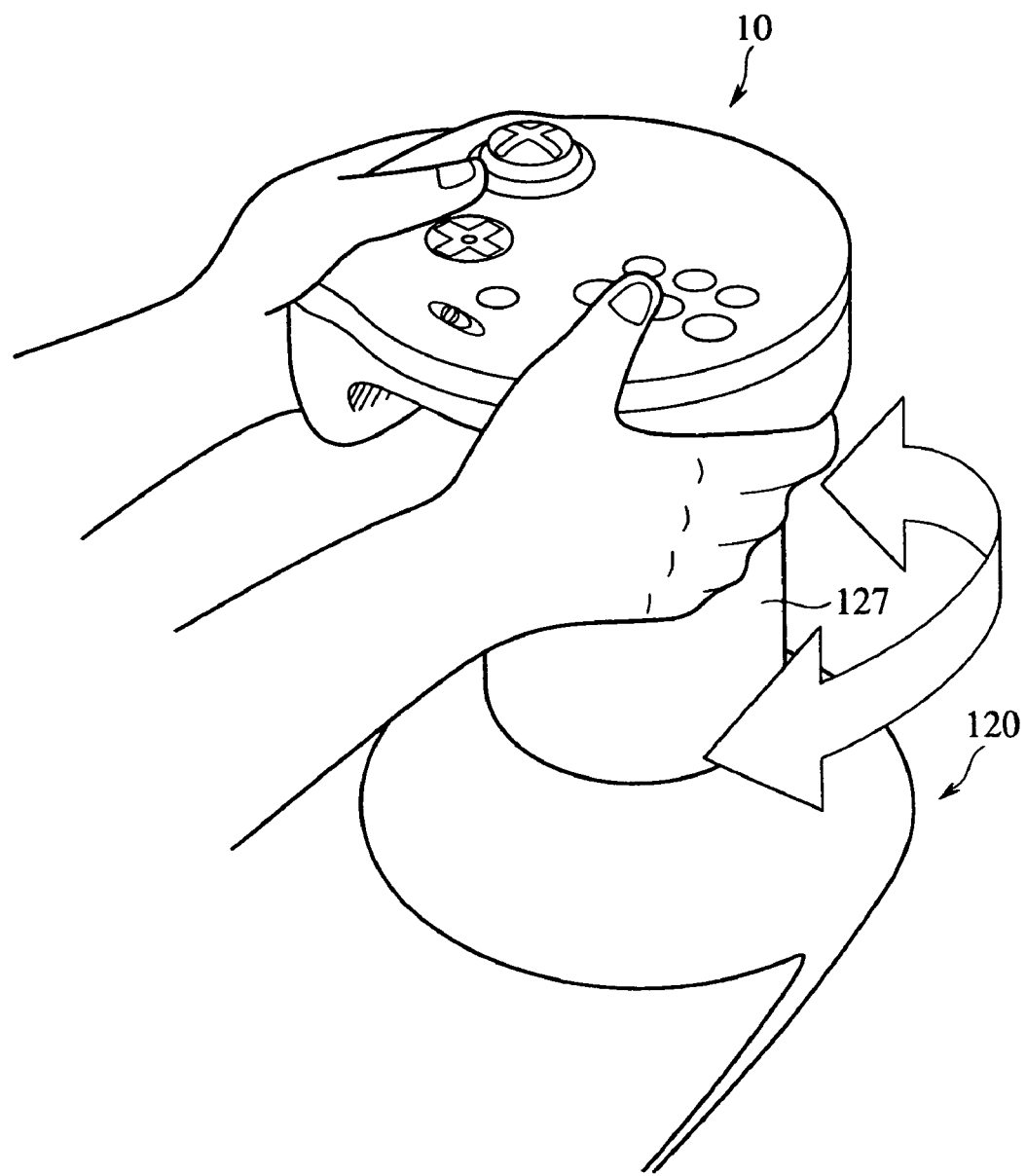
FIG. 32 is a perspective view of the held state of the example of the expansion unit including hand shaft for the controller according to the first embodiment of the present invention.

An expansion unit 120 shown in FIGS. 30 to 32 makes use of the circular shape of the controller body 10 to use the controller body 10 as a handle (rotational control).

As shown in FIG. 30, the expansion unit 120 which add the handle function includes a support base 126, and a handle shaft 127 is projected from the support base 126. The handle shaft 127 can be rotated, and the controller body 10 is secured to the handle shaft 127 by means of a screw. As shown in FIG. 31, a rotary angle detector 125 detects the rotation angle of the handle shaft 127 and outputs the angle to a control computer 124. The connector 121 on the handle shaft 127 is connected to the connector 26 of the controller body 10 as shown in FIG. 31. The expansion unit 120 contains the rotary angle detector 125 and the control computer 124 and is connected via connection cable 122 to game apparatus body 200 via connectors 123, 202 as shown in FIG. 31.

As shown in FIG. 32, when a player operates the controller body 10 as a handle, operation signals are added to command signals from the controller body 10 and are supplied to the game apparatus body 200.

The controller body 10 is thus used as a handle to make operations suitable for games.

(Inclination Detection Expansion Unit)

Figure 33:
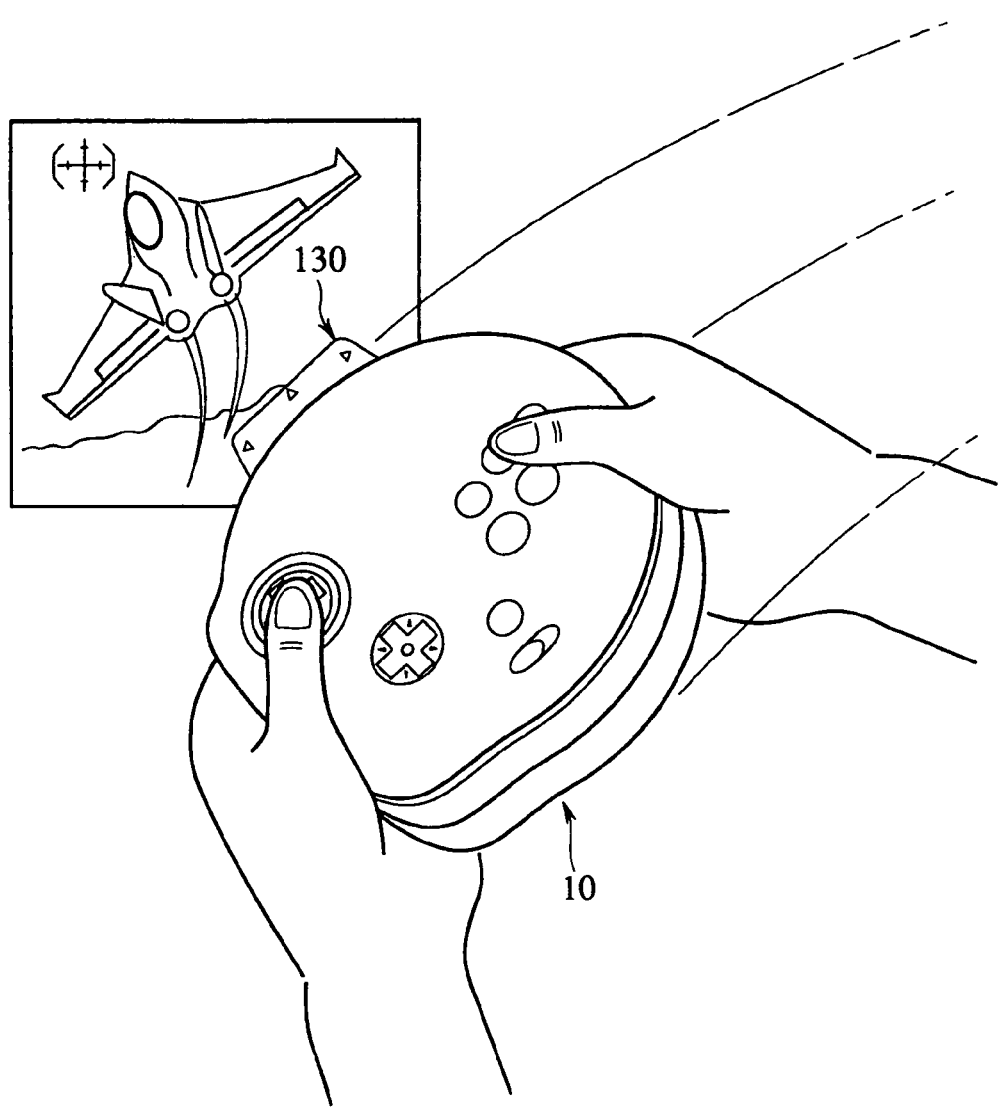
FIG. 33 is a perspective view of an example of the expansion unit including an inclination detecting unit for the controller according to the first embodiment of the present invention.
Figure 34:
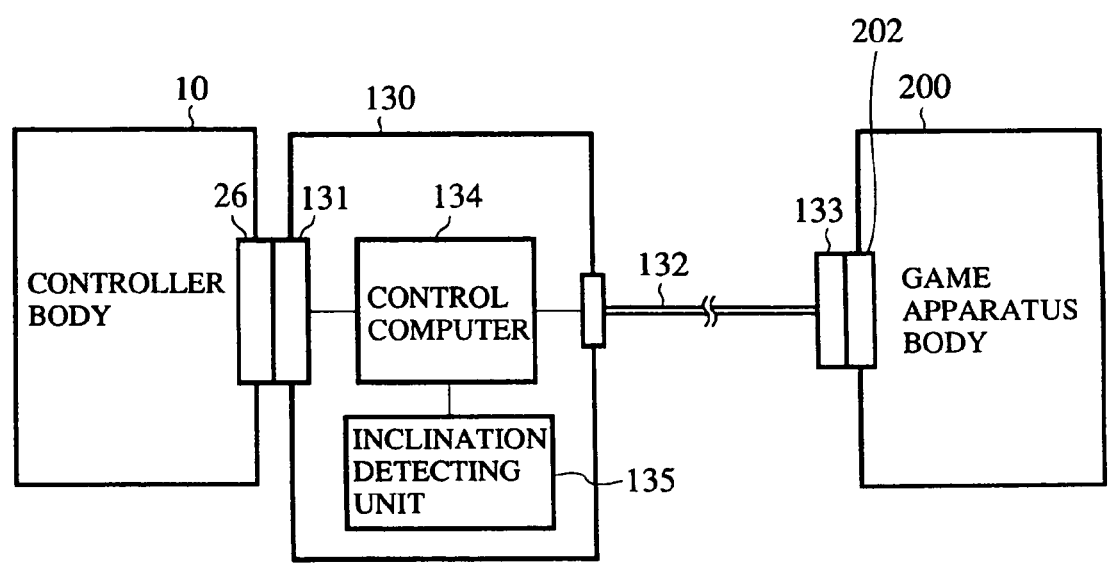
FIG. 34 is a block diagram of the example of the expansion unit including the inclination detecting unit for the controller according to the first embodiment of the present invention.

An expansion unit 130 shown in FIGS. 33 and 34 adds the function of detecting the inclination of the controller body 10.

The expansion unit 130 which adds the function of an inclination includes a connector 131 to be connected to the expansion connection of the controller body 10 just as the standard expansion unit 30 is, and a connector 133 to be connected to a connector 202 of a game apparatus body 200 is provided on the end of a connection cable 132. The expansion unit 130 includes a control computer 134 for the general control, and the control computer 134 includes an inclination detecting unit 135. The inclination detecting unit 135 detects an inclination angle of the controller body 10. Detected signals of the inclination detecting unit 135 are added by the control computer 134 to command signals from the controller body 130 and are outputted to the game apparatus body 200.

The detected signal of the inclination detecting unit 135 can be used in various ways. For example, in the game shown in FIG. 33, an airplane is operated, the control is made so that the airplane is tilted by an inclination of the controller body 10.

As described above, according to the present embodiment, expansion units can be attached to the conventional controller, whereby the controller can have optional additional functions. In the present embodiment, the expansion unit is inserted between the game apparatus body and the controller body, and based on expanded functions, command signals form the controller body are changed by the expansion unit, and supplies to the game apparatus body, whereby completely new functions can be optionally added without making changes to the controller body.

A Second Embodiment

Figure 35:
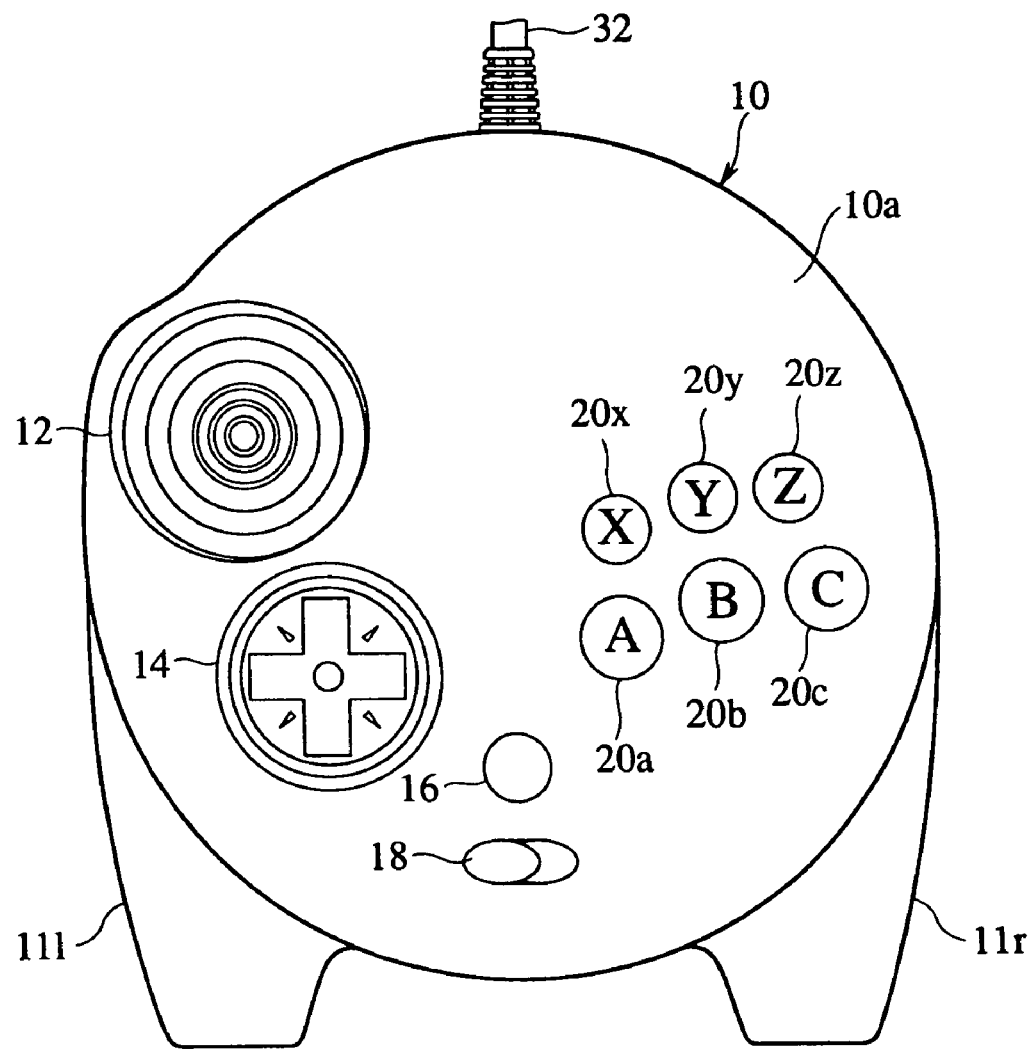
FIG. 35 is a plan view of the controller according to a second embodiment of the present invention.
Figure 36:
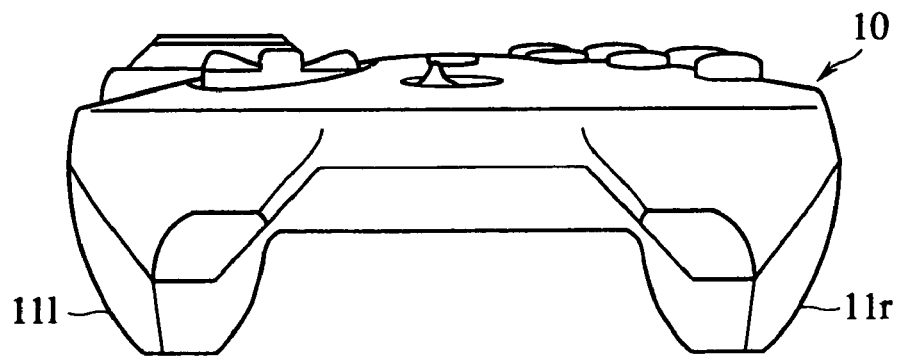
FIG. 36 is a front view of the controller according to the second embodiment of the present invention.
Figure 37:
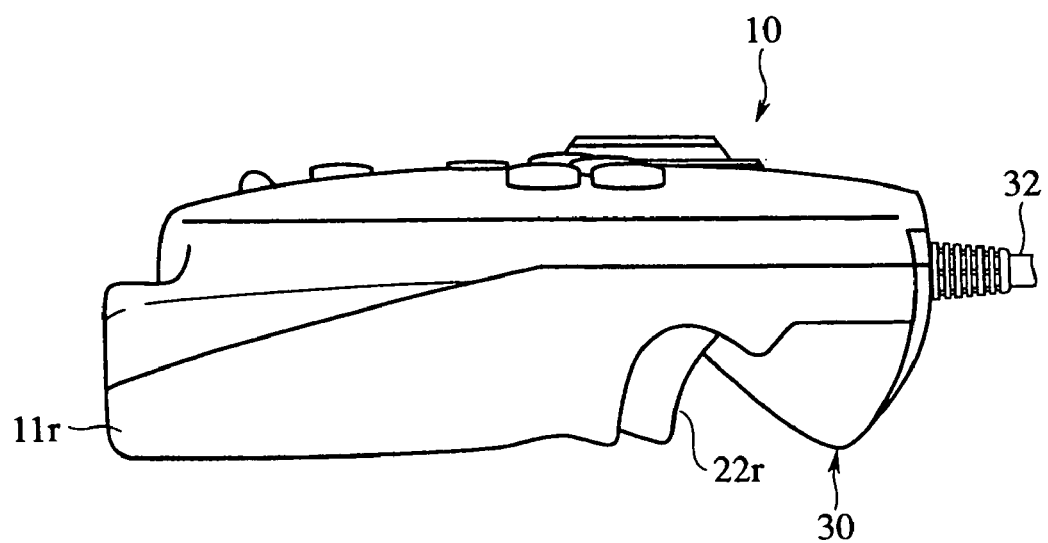
FIG. 37 is a right side view of the controller according to the second embodiment of the present invention.

The controller according to a second embodiment will be explained with reference to FIGS. 34 to 36. FIG. 35 is plan view of the controller according to the present embodiment. FIG. 36 is a front view of the controller according to the present embodiment. FIG. 37 is a right side view of the controller according to the present embodiment. The same members and members of the same kinds of the present embodiment as those of the first embodiment are represented by the same reference numerals not to repeat or simplify their explanation.

The controller according to the present embodiment is the same as the first embodiment in that the basic shape of the outside edge of a controller body 10 is circular, and includes two lugs 11*l*, 11*r* projected toward a player holding the controller body 10.

In the first embodiment, the left side of the controller body 10 is formed in a larger-diameter arcuate portion so that when a player grips the controller body 10, he can know the upward direction of a analog direction key 12 by the touch of the palm. In the present embodiment, because of the lug 11*l*, the controller body 10 has substantially the same shape on both the left and right sides. A player knows the upward direction of the analog direction key 12 by touching of the lugs 11*l*, 11*r*.

When a player holds the lugs 11*l*, 11*r* with his hands, he operates: the analog direction key 12 or a digital direction key 14 on the surface of the controller body 10 with the left thumb, the command lever 22*l* with the left index or middle finger, the command buttons 20*x*, 20*y*, 20*z*, 20*z*, 20*b*, 20*c* on the surface of the controller body 10 with the right thumb, and the command lever 22*r* on the back side with the right index or middle finger.

In the present embodiment, as shown in FIG. 35, conical grooves are formed in the top surface of the analog direction key 12 with no cross pattern. The analog direction key 12 can indicate all directions, and even if a cross pattern is formed, the direction of the cross pattern do not always agree with a direction indicated by the analog direction key 12. The cross pattern may rather puzzle players. This is because the conical grooves alone are formed. The conical grooves act as an anti-slipping means in operating the analog direction key 12.

Thus, according to the present embodiment, the lugs make the controller convenient for a player to grip during operation.

(Inclination Detection Expansion Unit with Vibration Function)

Figure 38:
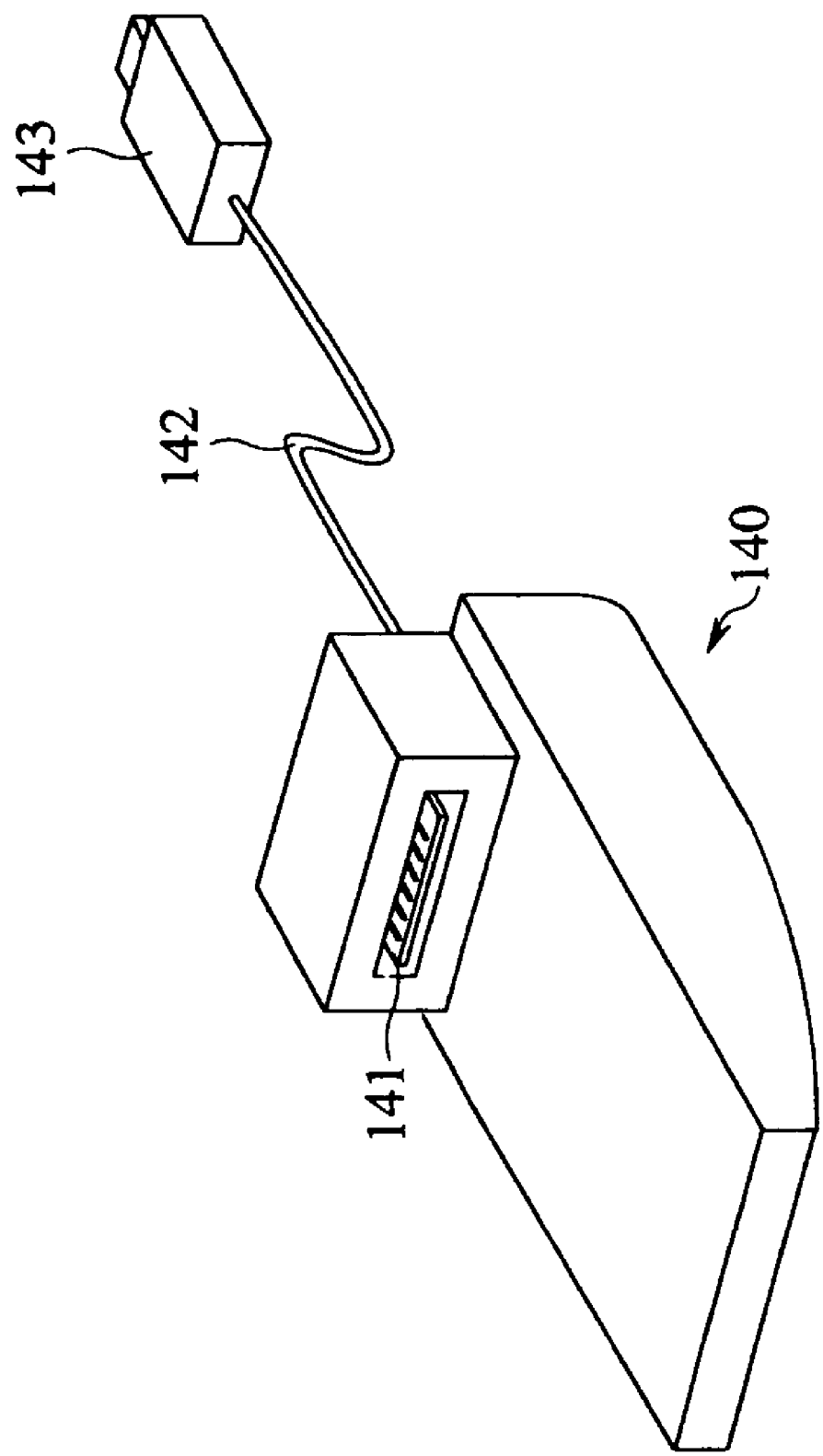
FIG. 38 is a perspective view of an example of the expansion unit including an inclination detection unit with a vibration function of the controller according to the second embodiment.
Figure 39:
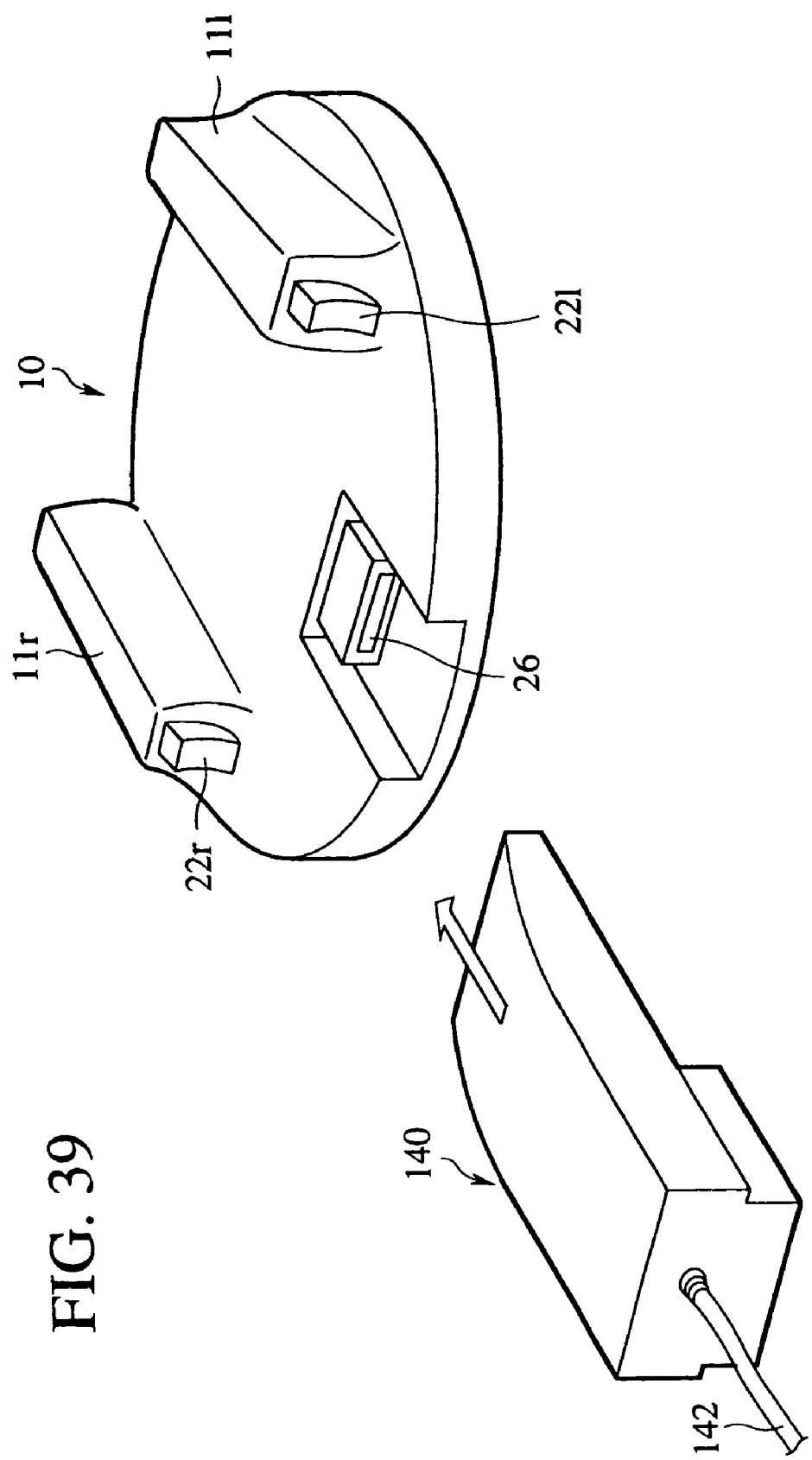
FIG. 39 is a backside view of the controller according to the second embodiment of the present invention with the expansion unit removed from the controller body.
Figure 40:
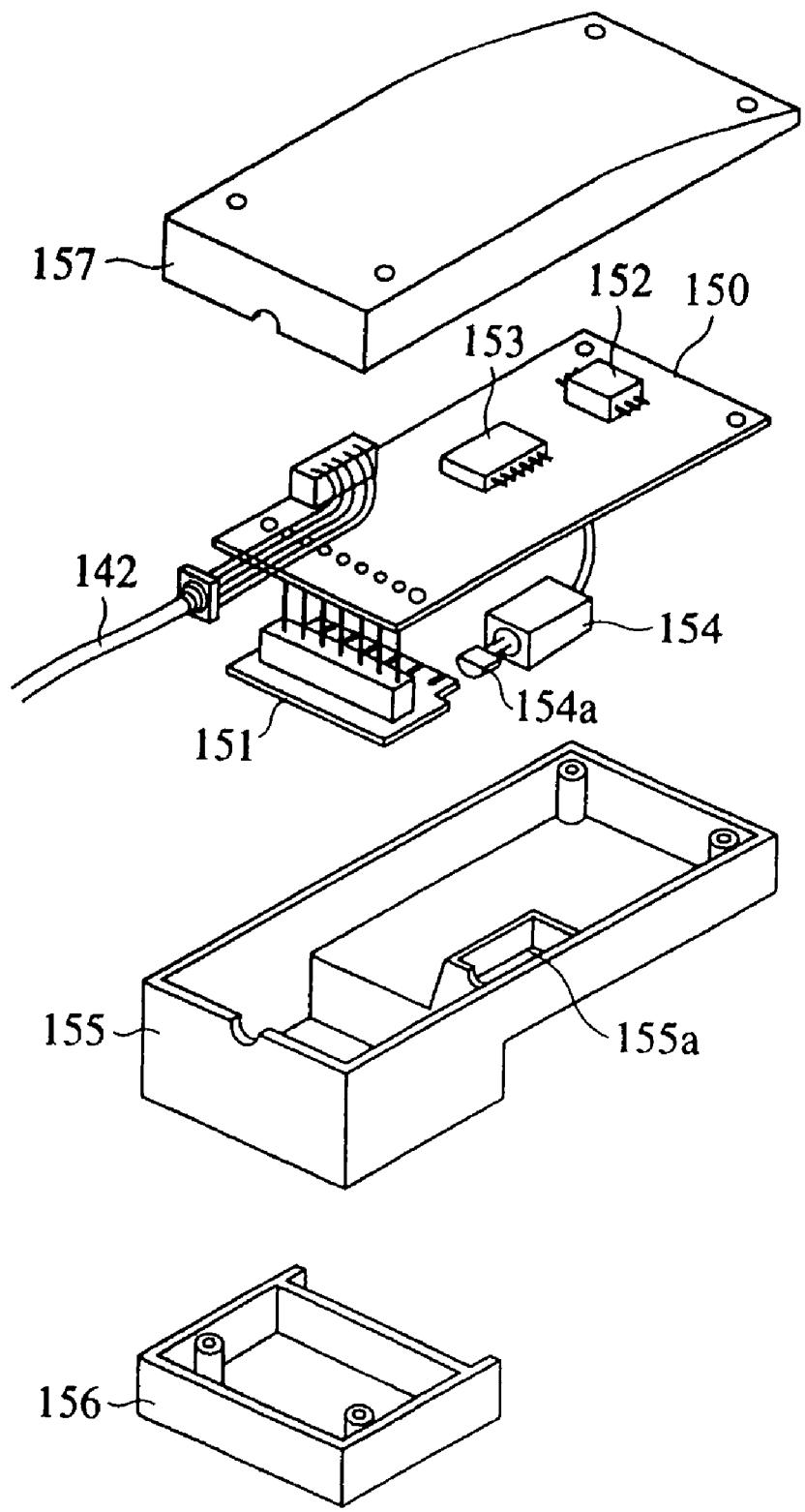
FIG. 40 is a broken perspective view of the example of the expansion unit including an inclination detection unit with the vibration function of the controller according to the second embodiment.
Figure 41:
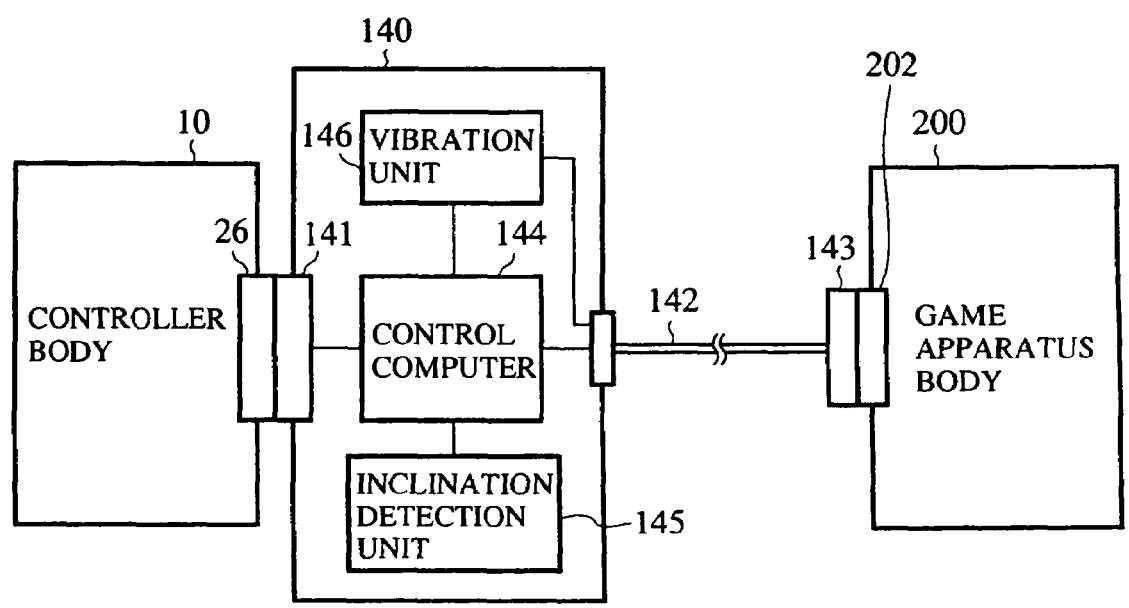
FIG. 41 is a block diagram of the example of the expansion unit including an inclination detection unit with the vibration function of the controller according to the second embodiment.

Then, as an example of the expansion unit of the present embodiment, an inclination detection expansion unit with a vibration function will be explained with reference to FIGS. 38 to 42. FIG. 38 is a perspective view of the present expansion unit. FIG. 39 is back side view of the present expansion unit removed from the controller body. FIG. 40 is a broken perspective view of the present expansion unit. FIG. 41 is a block diagram of the present expansion unit. FIG. 42 is views explaining an operation of the present expansion unit.

The inclination detection expansion unit with vibration function 140 adds the function of detecting an inclined state of the controller body 10 and the function of vibrating the controller body 10.

As shown in FIG. 38, as does the standard expansion unit 30, the expansion unit 140 includes a connector 141 to be connected to the expansion connector 26 of the controller body 10, and a connector 143 to be connected to the connector 202 of the game apparatus body 200 is provided on an end of a connection cable 142. As shown in FIG. 39, the expansion unit 140 is mounted on the back side of the controller body 10.

A structure of the inclination detection expansion unit with vibration function will be detailed with reference to FIG. 40. The expansion unit 140 includes a main circuit substrate 150. A connector substrate 151 is connected to one end of the main circuit substrate 150. An acceleration sensor 152 and a microcomputer 153 are mounted on the main circuit substrate 150. The acceleration sensor 152 can detect a rotation angle (a roll angle and a pitch angle) from an initial position. The main circuit substrate 150 is connected to a vibration motor 154. A semi-circular eccentric weight 154 is mounted on the rotary shaft of the vibration motor 154, and when the vibration motor 154 is rotated, vibrations are generated by the eccentric weight 154a.

The main circuit substrate 150 is secured to the case 155. The vibration motor 154 is fit in the box 155a in the case 155. The connector substrate 151 is secured to a case 156. The case 155 is covered by a case 157 with the connection cable 142 therebetween.

A function of the inclination detection expansion unit with vibration function 140 will be explained with reference to FIG. 41. The expansion unit 140 includes a control computer 144 for general control. The control computer 144 includes an inclination detection unit 145 and a vibration unit 146.

The control computer 144 includes a microcomputer 153 and generally controls the expansion unit 140. The inclination detection unit 145 includes the acceleration sensor 152 and detects an inclination angle of the controller body 10. A detection signal of the inclination detection unit 145 is added by the control computer 144 to a command signal from the controller body 140 to be supplied to the game apparatus body 200. The vibration unit 146 includes a vibration motor 154 and vibrates, based on a vibration command signal from the game apparatus body 200 or the controller body 10 to give vibrations to the controller body 10. Source electric power of the vibration motor 154 is supplied b the game apparatus body 200.

Then, the inclination detecting function will be detailed.

Figure 42A:
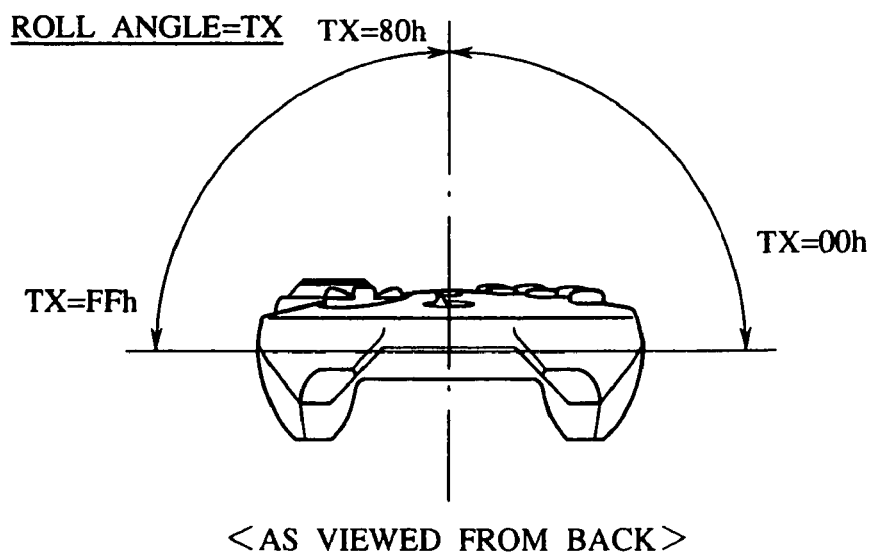
FIG. 42 is an explanatory view of an operation of the example of the expansion unit including an inclination detection unit with the vibration function of the controller according to the second embodiment.
Figure 42B:
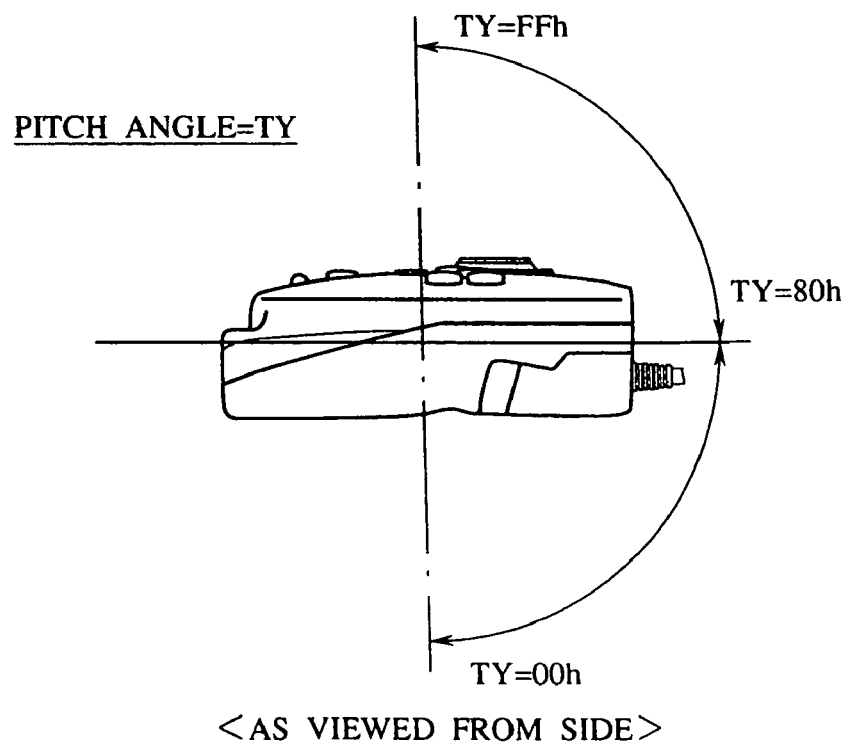

By mounting the expansion unit 140 on the controller body 10, an inclination angle of the controller can be detected. An inclination angle is represented by a rotation angle (a roll angle and a pitch angle) on the controller. A roll angle TX is represented as shown in FIG. 42A; as viewed at the back of the controller, when a central roll angle Tx is 80h, a rightist roll angle TX is 00h, and a leftist roll angle TX is FFh. A pitch angle is represented as shown in FIG. 42B; as viewed sideways, when a forward pitch angle TY is 80h, a lowermost pitch angle TY is 00h, and an uppermost pitch angle TY is FFh.

Accordingly, when the controller is tilted right, a roll angle TX is decreased, and a roll angle TX is increased when the controller is tilted left. When the controller is tilted downward, a pitch angle TY is decreased, and a pitch angle TY is increased when the controller is tilted upward.

An inclination angle of the inclination detection unit 145 is automatically centered in prescribed occasions while the controller is positioned in the central direction (a roll angle TX=80h, a pitch angle TY=80h). An inclination angle is automatically centered, e.g., when source electric power is supplied to the game apparatus body 200, the controller is connected to the game apparatus body 200, source electric power is supplied to the expansion unit 140, a mode is changed by operation of the change-over switch 18 of the controller body 10, the expansion unit 140 is connected to the controller body 10, and a reset signal is supplied from the game apparatus body 200.

An inclination angle has an insensitive range so that the controller does not react to a slight change of the inclination angle, and when an inclination angle changes by ?12 degrees, the controller judges that no inclination has took place. It is possible that an insensitive range of an inclination angle is changeable in response to a signal from the game apparatus body 200. Inclination sensitivity can be adjusted in accordance with a game.

It is also possible that a signal indicative an inclination angle of the inclination detection unit 145 is replaced by a command signal from the analog direction key 12 or a digital direction key 14 by changing a mode. This operation can be made by changing an inclination of the controller in place of operating the analog direction ky 12 or the digital direction key 14.

Then, the vibration function will be detailed.

The expansion unit 140 is connected to the controller body 10, whereby vibrations can be given to the controller. An intensity of the vibrations can be set by a signal from the game apparatus body 200. The intensity can be adjusted to be, e.g., 8 stages from a vibration intensity=0 (no vibration) to a vibration intensity=1 to 7.

To ensure safety upon the vibration, source electric power of the vibration motor 154 is supplied by the game apparatus body 200, so that the vibration is stopped by disconnecting the connector 143 of the expansion unit 140 from the game apparatus body 220. The vibration is forcedly stopped when no signal is outputted from the game apparatus body 200 within a prescribed period of time. Thus a danger that the vibration is not stopped when the game apparatus body 200 is hung up or when the reset switch is pressed can be prevented. The vibration is forcedly stopped when a mode is changed by the change-over switch 18 of the controller body 10.

The inclination detection expansion unit with vibration function of this example has a wide variety of uses. For example, the inclination detecting function is used, and the controller itself is operated as the handle of a car. It is possible that the vibration function is used to give trivial vibrations when the car is driven on a bad road, and strong vibrations are given when the car collides. It is also possible that the inclination detecting function is used to operate the controller itself as the column of an airplane. The vibration function may be used to give trivial vibrations for landing of the airplane, and strong vibrations may be given when the airplane is shot.

A Third Embodiment

Figure 43:
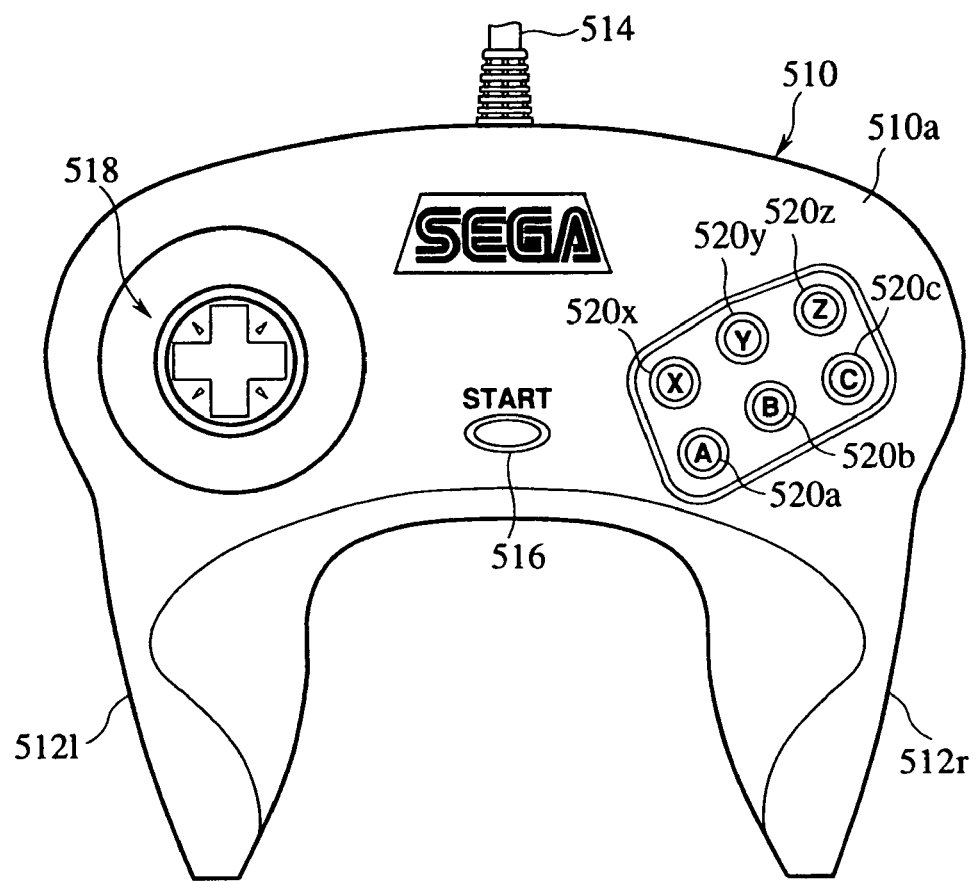
FIG. 43 is a plan view of the controller according to a third embodiment of the present invention.
Figure 45:
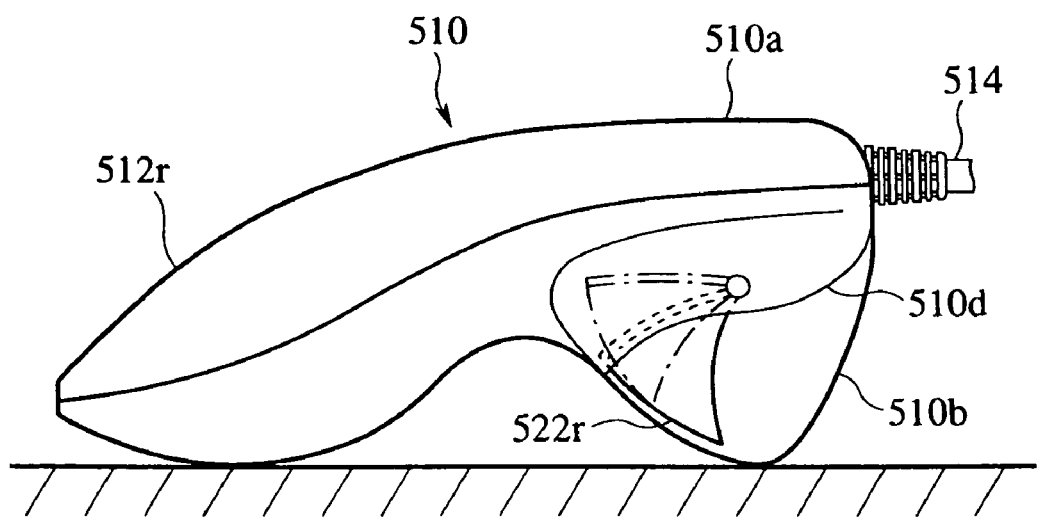
FIG. 45 is a right side view of the controller according to the third embodiment of the present invention.
Figure 46:
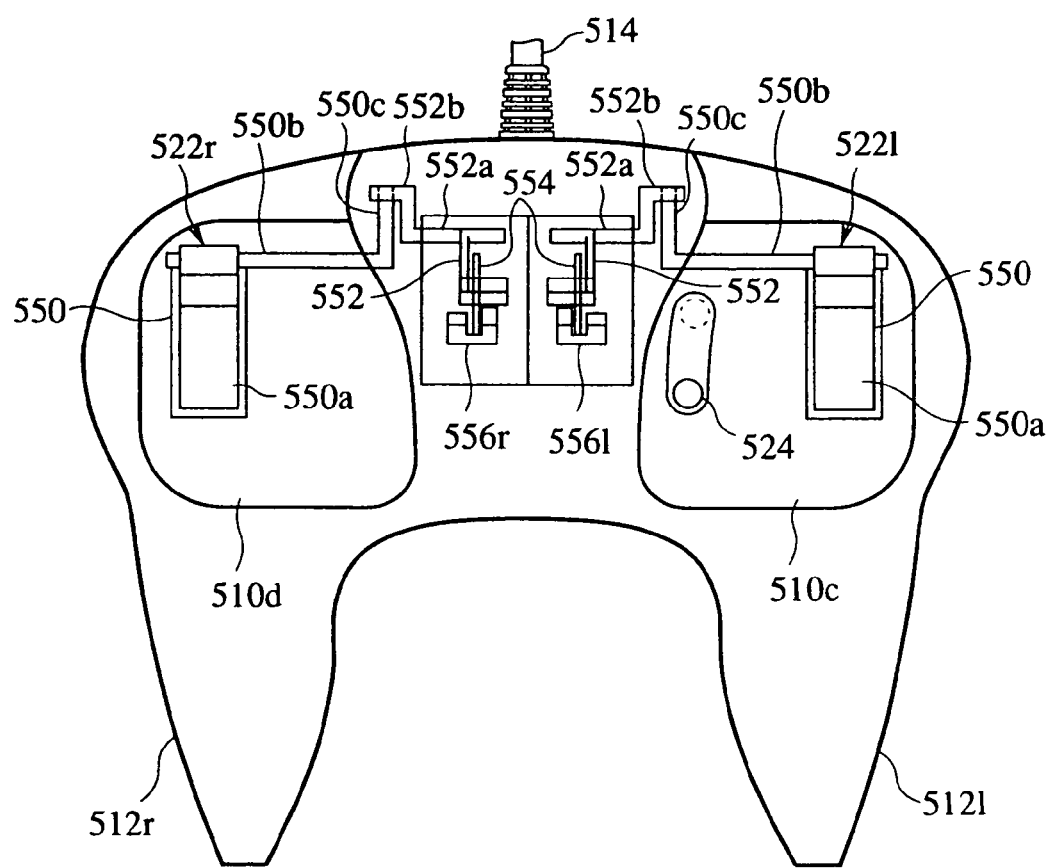
FIG. 46 is a bottom view of the controller according to the third embodiment of the present invention.

The controller according to a third embodiment of the present invention will be explained with reference to FIGS. 48 to 50. FIG. 43 is a plan view of the controller according to the present embodiment. FIG. 45 is a right side view of the controller according to the present embodiment. FIG. 46 is a bottom view of the controller according to the present embodiment.

As shown in FIG. 43, two grips 512*l*, 512*r* for a player to hold with the hands are extended from a controller body 510 toward the player. A connection cable 514 to be connected to a game apparatus body (not shown) is provided at the center of the side opposite to the grips 512*l*, 512*r* of the controller body 510.

A start button 516 is provided at the lower central part of an operational surface 510a which is the upper surface of the controller body 510. A direction key 518 for commanding directions is provided on the left side of the operational surface 510a. Six command buttons 520*x*, 520*y*, 520*z*, 520*a*, 520*b*, 520*c* are provided on the right side of the operational surface 510a.

Figure 44:
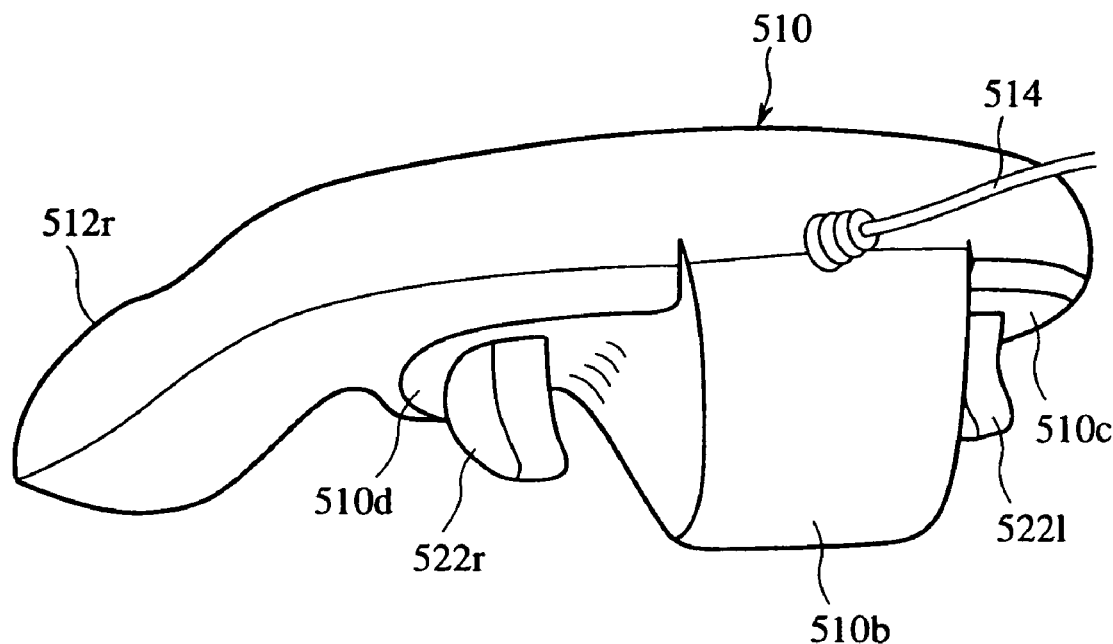
FIG. 44 is a perspective view of the controller according to the third embodiment of the present invention as viewed slantly from the back.

As shown in FIG. 44, a bulge 510b is provided at the central backside of the controller body 510. The bulge 510b and the two grips 512l, 512r enable the controller body 510 to be mounted stable on a flat surface, as of a table or the like. Parts of the backside of the controller body 510, which are on both sides of the bulge are recessed, and command levers 522l, 522r are provided on operational surfaces 510c, 510d which are the recessed parts on both sides of the bulge.

Further, on the operational surface 510c which is the backside of the controller 510 there is provided a change-over switch 524 for switching functions of a cross key 518.

Thus, the controller according to the present embodiment includes the start button 516, the direction key 518 and the command buttons 520x, 520y, 520z, 520a, 520b, 520c on the operational surface 510a which is the upper surface a start button 516, and includes the command levers 522l, 522r and the change-over switch 524 on the operational surfaces 510c, 510d which are the backside of the controller.

The start button 516 is a command button of the type that one command can be inputted by once pressing the start button. The start button is disposed at the lower central part of the upper surface, which makes it difficult to frequently press the start button. The start button is used to make commands, such as a start command for starting a game, or others, which do not require pressing the start button during a game.

The direction key 518 of the present embodiment can make direction commands for 8 preset directions which are spaced from each other, the so-called digital direction commands, and also make continuous direction commands which command all the directions over 360°, the so-called analog direction commands. The direction key 518 is disposed on the left side of the operational surface 510a on the upper surface and is usually operated by the left thumb of a player.

Figure 47:
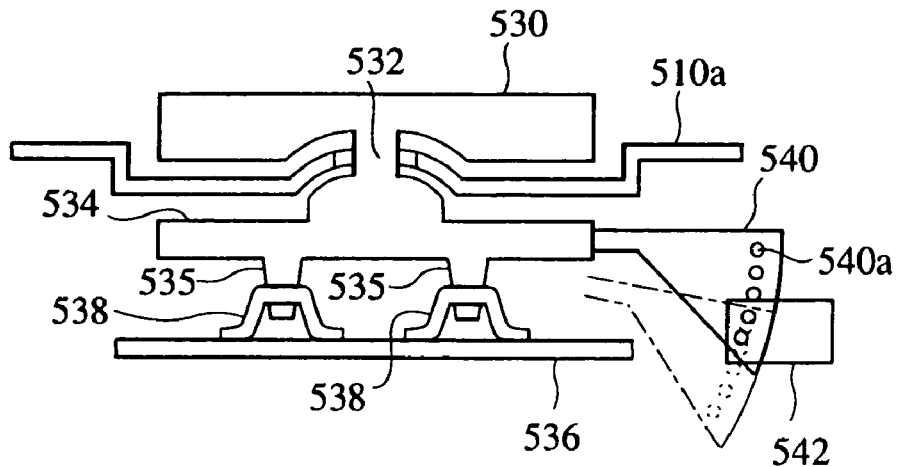
FIG. 47 is an explanatory view of a mechanism of the direction key of the controller according to the third embodiment of the present invention.

A mechanism of the direction key 518 will be detailed with reference to FIG. 47. The direction key 518 is in the form of a circular operational plate 530 appearing on the operational surface 510a. On the upper surface of the operational plate 530, a cross-shaped relief is formed as a mark for facilitating a player knowing an operational direction. The operational plate 530 is connected to a circular plate 534 provided inner of the operational surface 510a. The circular plate 534 is integrated with the operational plate 530 and is moved following the operational plate 530.

On the underside of the circular plate 534 there are provided convexities 535 at positions corresponding to four directions, upper and downward, and left and right directions. A base plate 536 is provided below the circular plate 534, and rubber switches 538 are provided at positions opposed to the convexities 535 on the circular pate 534.

When a player operates to tilt the operational plate 530 in one direction, the associated convexity 535 presses down the associated rubber switch 538 to short-circuit an electrode pattern (not shown) on the base plate 536 to detect the operational direction. When the operational plate 530 is tilted in one of the upper and downward, and left and right directions, the associated rubber switch 538 is pressed own, whereby the four directions can be detected. When the operational plate 530 is tilted in a direction between the upward and the down directions and the left and the right directions, and their adjacent directions, two rubber switches are pressed down together, and totally 8 directions including the upper and the downward directions and the left and the right directions can be detected.

Secular encoders 540 are provided on the circular plate 534 at the ends of two directions crossing each other. Each encoder 540 has holes 540a opened at a certain interval along the peripheral edge thereof. As shown in FIG. 47, the secular encoders 540 are moved up and down on a vicinity of the rod 532 corresponding to an inclination of the circular plate 534. Photo-interrupters 542 are disposed, holding the peripheral edges of the respective encoders 540.

Each photo-interrupters 542 includes a light emitting device (not shown) and a photo-detecting device (not shown), and detects presence and absence of an object in an optical path between the light emitting device and the photo-detecting device. When the encoder 540 is moved up and down, the associated photo-interrupter 542 detects passing of the holes 540a to detect vertical positions of the encoder. The encoders 534 are disposed along two directions of the circular plate 534, which crosses each other. Based on vertical positions of the two encoders 540, a direction of tilt of the circular plate 543 can be known. Thus an arbitrary direction of the operational plate 530 operated by a player can be detected, and all directions over 360° can be commanded.

As described above, the direction key 518 of the present embodiment can make not only 8 digital direction commands, but also all analog direction commands over 360°. The digital direction command and the analog direction command can be changed over to each other by the change-over switch 524 provided on the backside of the controller body 510.

The command buttons 520x, 520y, 520z, 520a, 520b, 520c are of the type that one command can be inputted by once pressing them, as is the start button 516. The command buttons 520x, 520y, 520z, 520a, 520b, 520c are disposed on the right side of the upper surface of the operational surface 510a and are operated usually by the right thumb of an operator.

The command levers 522l, 522r are pulled toward the foreground to input command amounts which are continuously changed. The command levers 522l, 522r are disposed on the left and the right operational surfaces 510c, 510d of the backside. As shown in FIG. 49, the command levers 522l, 522r are pulled toward the foreground by, e.g., the index fingers or the middle fingers when a player holds the controller with the grips 512l, 512r with the left and the right hands.

Mechanisms of the command levers 522l, 522r will be explained with reference to FIGS. 46 and 48. The mechanisms of the command levers 522l, 522r are the same except that they are horizontally symmetrical to each other, and the command lever 522l shown on the right side in FIG. 46 will be explained. FIG. 48 is explanatory views of component members of the command lever 522l, which explain their relationships and shows the mechanism of the command lever 522l as viewed on the right side.

As shown in FIG. 46, the command levers 522l, 522r have operational levers 550 which are projected beyond the operational surface 510c. As shown in FIG. 48B, the operational lever 550 includes a shaft 550b provided at the root of a secular operational portion 550a, and the shaft 550b is bent at a right angle. The operational portion 550a of the operational lever 550 is pulled toward the foreground and is rotated on the shaft 550b.

A detection mechanism for detecting an operational angle of the command lever 522l is disposed in the projected in the bulge 510b of the controller body 510. The detection mechanism includes a secular gear, a circular encoder 554 and a photo-interrupter 561l.

The secular gear 552 has teeth formed in the arcuate periphery, and a shaft 552a disposed at the center thereof. The shaft 552a is bent at a right angle and further at a right angle. The secular gear 552 is rotated on the shaft 552a.

An end of the shaft 552a of the secular gear 552 abuts upon an end of an end 552b of the shaft 552a, and when the operational lever 550 is rotated on the shaft 550b, the end 550c of the shaft 550b pushes the end 552b of the secular gear 552 to rotate the secular gear 550c.

Figure 48A:
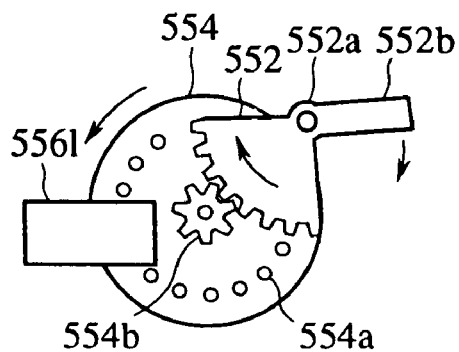
FIG. 48 is an explanatory view of a mechanism of the command lever of the controller according to the third embodiment of the present invention.
Figure 48B:
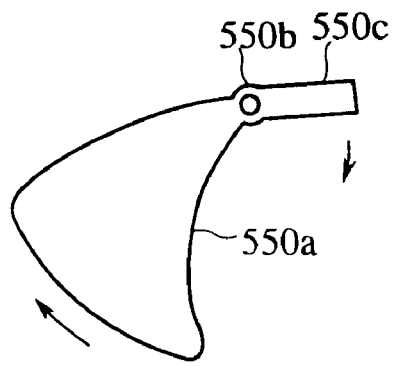

As shown in FIG. 48A, the circular encoder 554 has holes 554a formed in the peripheral edge at a certain interval. The circular gear 554b is formed on the center of the circular encoder 554. As shown in FIG. 48A, the circular gear 554b is in mesh with the circular gear 552, and when the circular gear 552 is rotated, the circular encoder 554 is rotated through the circular gear 554b.

A photo-interrupter 556l is disposed, holding the circular encoder 554 therebetween, and passing of the holes 554a in the circular encoder 554 is detected to detect rotation angles of the circular encoder 554 and rotation angles of the operational lever 550. The command levers 522l, 522r are thus operated to supply continuously changing command amounts corresponding to rotation angles of the operational leer 550, which cannot be supplied by the command buttons 520x, 520y, 520a. 520b, 520c.

Figure 49:
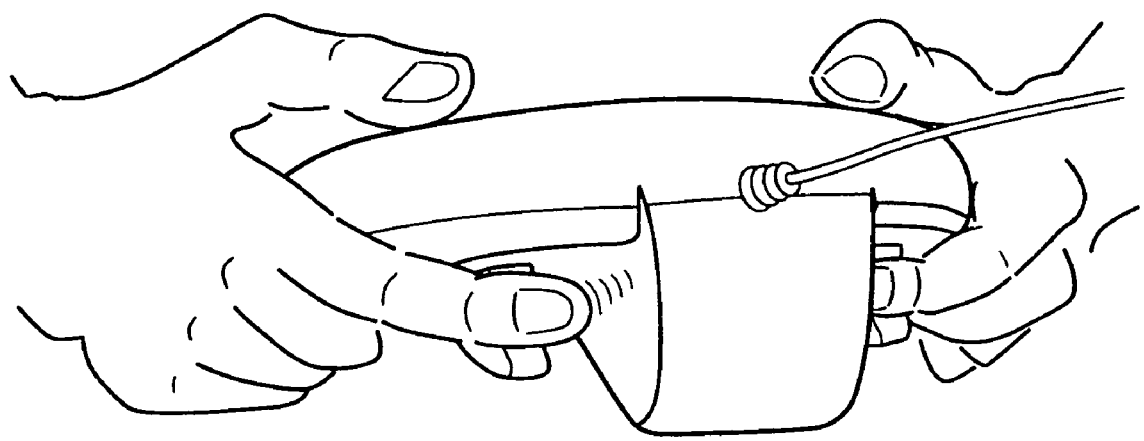
FIG. 49 is a perspective view of the controller according to the third embodiment of the present invention, which shows an operational state.
Figure 50:
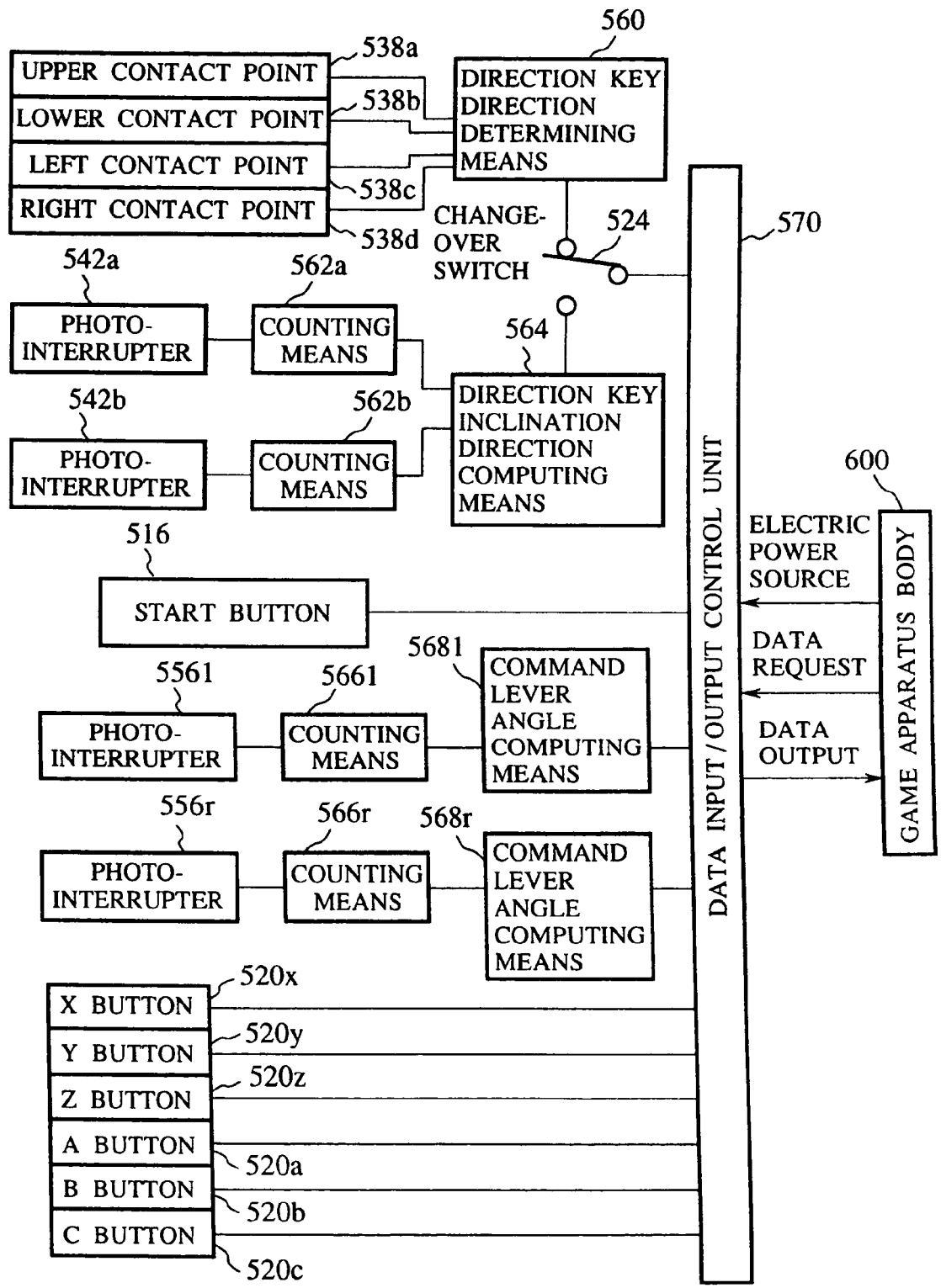
FIG. 50 is a block diagram of a circuit of the controller according to the third embodiment of the present invention, which shows a structure thereof.

When a player operates the controller according to the present embodiment, holding the controller with the hands, as shown in FIG. 49, the left and the right grips 512 of the controller body 510 are held by the left and the right hands. The left hand operates the direction key on the surface with the thumb, and the command lever 522l on the backside with the thumb and the middle finger. The right hand operates the command buttons 520x, 520y, 520z, 520a, 520b, 520c on the surface with the thumb, and the command lever 522r on the backside with the index finger or the middle finger. As described above, according to the present embodiment, continuously changing commands can be made, which the conventional controller has found impossible, and commands of arbitrary directions and commands of continuously changing directions can be made. The command levers provided on the backside of the controller allows more complicated command to be made. Furthermore, complicated commands can be relatively easily with the grips stably held.

When the controller according to the present embodiment is placed on a flat surface, such as a desk, with three points of the bulge 510b and the grips 512l, 512r supported on the flat surface, and the controller can be operated in a stable state. When the controller is placed on a flat surface, such as a desk, as shown in FIG. 45, the operational surface 510a, which is the upper surface of the controller with the direction key 510 and the command buttons 520x-520c provided on is parallel with the flat surface, such as the desk, which enables a player to easily operate the direction key 518 and the command buttons 520x-520c.

When the controller is placed on a desk or the like, as shown in FIG. 45, the command levers 522l, 522r do not abut on the desk and define a space which allows the controller to be operated with fingers, and the command levers can be easily operated with both hands placed on the grips 512l, 512r.

It is often that the controller is roughly handled, and because of the command levers 522l, 522r disposed in the operational surfaces 510c, 510d which are cavities beside the bulge 510b on the backside of the controller body 510, even when the controller is dropped or is hit against another object, the command levers 522l, 522r are prevented from direct impact.

Then, a circuit diagram of the controller according to the present embodiment will be explained with reference to the block diagram of FIG. 50.

For the digital direction command by the direction key 514, an upper contact 538a, a lower contact 538c, a left contact and a right contact 538d are constituted by the rubber switch 538, and correspond to the upper and the downward directions and the left and the right directions. Outputs from the respective contacts 538a-538d are inputted to direction key direction determining means 560. Based on the outputs, the direction key direction determining means 560 determines a direction of an inclination of the operational plate 530 commanded by the direction key 514.

On the other hand, for the analog direction command by the direction key 514, photo-interrupters 542a, 542b are disposed in directions of the circular plate 534 crossing each other. The photo-interrupters 542a, 542b respectively include counting means 562a, 562b for counting numbers of holes 540a of encoders 540, which have passed. Based on counted values given by the counting means 562a, 562b, direction key inclination direction computing means 564 an inclination direction of an inclination of the circular plate 534 commanded by the direction key 514. A most inclined direction is a commanded direction.

Outputs of the direction key determining means 560 and the direction key inclination direction computing means 564 are changed over to each other to be inputted to data input/output control unit 570.

A output of the start button 516 is inputted directly in the data input/output control unit 570.

The photo-interrupter 556l of the command lever 522l and the photo-interrupter 556r of the command lever 522r respectively includes counting means 566l, 566r, and counts numbers of holes 554a in circular encoders, which have passed. Based on counted values given by the counting means 556l, command lever angle computing means 568l computes a rotation angle of the operational lever 550 commanded by the command lever 522r.

Computed outputs from the command lever angle computing means 568l, 568r are inputted to data input/output control unit 570.

Outputs of the command buttons 520x, 520y, 520z, 520a, 520b, 520c are inputted directly to the data input/output control unit 570.

The data input/output control unit 570 receives signals from the above-described component members to select necessary data corresponding to a data request outputted by the game apparatus body 600 and supplies the data to the game apparatus body 600 through the cable 514.

Source electric power of the entire controller is supplied by the game apparatus body 600 through the cable 514.

As described above, according to the present embodiment, the command lever is operated to make continuously changing command which has been impossible in the conventional controller. Arbitrary direction commands can be made by detecting an inclination direction of the operational plate. Furthermore, the command levers are disposed on the operational surface, which is the backside of the controller, so that when the controller is held with the hands, the command levers can be operated with the index fingers and middle fingers, and can be easily subtly operated.

The controller according to the present embodiment can realize natural and comfortable operational feelings in games on which the conventional controller has found it difficult. In a racing game, for example, the direction key is used in steering a handle, the command buttons are used in the gear shift operation and the shift lever operation, the left command lever is used in braking, and the right command lever is used in acceleration, whereby subtle operations can be realized with natural feelings.

Modified Embodiment

The present invention is not limited to the above-described embodiments and covers other various modifications.

For example, the expansion units described in the above-described first and second embodiments are examples and may include those embodiments which add other functions.

The direction key of the controller may have a mechanism other than the above-described mechanism of the third embodiment to detect an inclination direction of the direction key. It is also possible to detect an arbitrary angle, based on a direction of an inclination of an operational unit, such as a joy stick.

In the above-described third embodiment, the digital direction command and the analog direction command by the direction key are changed over to each other by the change-over switch, but it is possible that the change-over switch is not provided, and the key direction itself is operated to change over the digital and analog direction command to each other. It is also possible that data of both a digital direction command and an analog direction command are supplied for the game apparatus body to selectively use the data.

The command levers of the controller may have a mechanism other the above-described mechanism of the controller according to the third embodiment to detect continuously changing command amounts. It is possible to provide command buttons for outputting one command by one operation in place of the command levers provided on the operational surface, which is the backside of the controller body, and when the controller is held with the hands, the controller can be easily operated with the fingers other than the thumbs, which are not used, and can have more command buttons than the conventional controller.

In the above-described embodiments, the present invention is applied to the controller to be used with a game apparatus, but may be applied to controllers as an input means for controlling electronic devices other than game apparatuses.

In the present specification, "continuously" in "continuously changing", "continuous command directions", etc. include not only the so-called continuous analog amounts, but also digital amounts of digital signals converted from analog signals, which strictly are not continuous and discrete, but can be seen as continuous in terms of signal processing.

INDUSTRIAL APPLICABILITY

The present invention is suitable as a controller for supplying various command to an electronic apparatus by operation of the controller by an operator, more specifically as a controller of a game apparatus, for supplying commands corresponding to game contents.

The invention claimed is:

1. An electronic device for executing a game in response to instruction signals from a manipulating controller,
wherein said manipulating controller comprises a first direction key arranged so as to give signals indicative of preset discrete directions, a plurality of instruction buttons and a second direction key arranged so as to give signals indicative of arbitrary directions, said manipulating controller being arranged so as to transmit to said electronic device signals indicative of preset discrete directions generated by manipulating said first direction key, one-shot signals generated by manipulating plurality of instruction buttons, and signals indicative of arbitrary directions or of continuously changing directions generated by manipulating said second direction key,
said electronic devices comprising:
means for executing a game by a first game operation mode in response to signals of said preset discrete directions and said one-shot signals;
means for executing a game by a second game operation mode in response to signals including signals of said arbitrary directions; and
means for executing the game selectively by one of said first and second operation modes when received instruction signals from said manipulating controller.

* * * * *

UNITED STATES PATENT AND TRADEMARK OFFICE
CERTIFICATE OF CORRECTION

| | |
|---|---|
| PATENT NO. | : 7,473,180 B2 |
| APPLICATION NO. | : 11/107818 |
| DATED | : January 6, 2009 |
| INVENTOR(S) | : Atsunori Himoto et al. |

It is certified that error appears in the above-identified patent and that said Letters Patent is hereby corrected as shown below:

Cover Page:

Add the following data:

(30) Foreign Application Priority Data

Mar. 5, 1996   (JP)  ............... 8/47691

Mar. 26, 1996  (JP)  ............... 8/70769

Apr. 24, 1996  (JP)  ............... 8/102413

Signed and Sealed this

Twenty-eighth Day of June, 2011

David J. Kappos
*Director of the United States Patent and Trademark Office*